(12) United States Patent
Berkner et al.

(10) Patent No.: US 7,177,488 B2
(45) Date of Patent: Feb. 13, 2007

(54) RESOLUTION SENSITIVE LAYOUT OF DOCUMENT REGIONS

(75) Inventors: Kathrin Berkner, Menlo Park, CA (US); Edward L. Schwartz, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 154 days.

(21) Appl. No.: 10/435,300

(22) Filed: May 9, 2003

(65) Prior Publication Data

US 2004/0145593 A1    Jul. 29, 2004

Related U.S. Application Data

(63) Continuation-in-part of application No. 10/354,811, filed on Jan. 29, 2003.

(51) Int. Cl.
*G06K 9/32*    (2006.01)
*G06K 9/34*    (2006.01)
*G09G 5/00*    (2006.01)

(52) U.S. Cl. ............... 382/298; 382/176; 345/619

(58) Field of Classification Search ............ 382/176, 382/181, 282, 298, 313, 321; 345/428, 660, 345/619; 348/561, 581; 358/451
See application file for complete search history.

(56) References Cited

U.S. PATENT DOCUMENTS

| | | | | |
|---|---|---|---|---|
| 5,897,644 A | * | 4/1999 | Nielsen | 715/513 |
| 5,960,126 A | * | 9/1999 | Nielsen et al. | 382/298 |
| 6,178,272 B1 | * | 1/2001 | Segman | 382/298 |
| 6,317,164 B1 | * | 11/2001 | Hrusecky et al. | 348/581 |
| 6,665,841 B1 | * | 12/2003 | Mahoney et al. | 715/520 |
| 6,747,648 B2 | * | 6/2004 | Hoehn et al. | 345/428 |
| 6,788,347 B1 | * | 9/2004 | Kim et al. | 348/441 |
| 6,804,418 B1 | * | 10/2004 | Yu et al. | 382/299 |
| 6,873,343 B2 | * | 3/2005 | Chui | 345/667 |

* cited by examiner

*Primary Examiner*—Daniel Mariam
(74) *Attorney, Agent, or Firm*—Blakely, Sokoloff, Taylor & Zafman LLP

(57) ABSTRACT

A method and apparatus for reformatting a document is disclosed. In one embodiment, the method comprises selecting a plurality of image segments having a plurality of attributes and determining a plurality of positions and a plurality of geometric operations to be performed on the plurality of image segments according to the plurality of attributes.

77 Claims, 27 Drawing Sheets

Input fle describing areas

3360 4382
0 0 3 408 121 214 13 25.1
1 0 2 407 178 399 26 15.1
2 0 2 601 227 184 55 12.1
3 0 2 219 226 218 54 11.7

Canvas size

130 160

FIG. 3A – minimum scaling (traditional thumbnail scale and position)

| area A<br>width 55<br>height 30 | area B<br>width 60<br>height 20 | max row height 30 |
|---|---|---|
| area C<br>width 70<br>height 25 | area D<br>width 53<br>height 40 | max row height 40 |
| max column<br>width 70 | max column<br>width 60 | |

FIG. 16 collection of boxes canvas collection of boxes after adjusting the anchor point with respect to the canvas

RESOLUTION SENSITIVE LAYOUT OF DOCUMENT REGIONS

The present patent application is a Continuation-in-Part of application Ser. No. 10/354,811, filed Jan. 29, 2003.

FIELD OF INVENTION

The present invention relates to image processing, and more particularly, to reformatting images to generate a representation of the images given display constraints.

BACKGROUND

With improved display technology, increasing mobile computing and data storage capabilities, the trend exists on increasing the amount of image information shown on physical and virtual displays of smaller and smaller size, such as handheld devices, cell phones, browser windows and thumbnails. Such a display of image information requires reformatting originally stored images, often called repurposing.

Given a scanned document, resizing of the entire document to a target display (hereinafter referred as canvas) by downsampling often results in loss of readability of text and recognizability of image features.

There are many prior art techniques related to reformatting documents and images. These include pagination and formatting, yellow-pages pagination and layout, document summarization, text summarization for handheld devices, web images for handheld devices, and video summarization.

Pagination and formatting are standard parts of every typesetting program. Usually, the initial page space is unlimited and ASCII text and images are placed in a way that semantic orders and relationships between pictures and text references are maintained. For more information, see, for example, *The TeXbook*, by D. E. Knuth, Addison-Wesley, 1986. The goal is to keep the numbers of pages as small as possible, while including all the available text and all pictures. In one existing method, document objects are rearranged on pages (called tiling), where a user determines which parts to delete, expand or shrink. After that decision has been made up front, an algorithm determines a layout that minimizes the number of pages used. An ordering of text objects is performed with respect to the reading order from the segmentation process, and images are squeezed into this order by checking the closest text object neighbors. For more information, see U.S. Pat. No. 5,553,217, entitled "Document Layout Using Tiling", issued to Hart et al.

The layout for Yellow-Pages types of documents faces the problem of placing ads near corresponding text sections while using as few pages as possible. The size for text and ads is fixed, and all objects have to be included (e.g., R. Johari, J. Marks, A. Partovi, and S. Shieber, "Automatic Yellow-Pages Pagination and Layout," *Journal of Heuristics*, pp. 321–342, 1997).

A representation of pictorial structures is given in M. A. Fischler, R. A. Elschlager "The Representation and Matching of Pictorial Structures," IEEE Transactions on Computers, vol. C-22, No. 1, January 1973. The authors present a description of an image into a number of components held together by "springs". The description is used for deriving a metric to measure similarity of images by allowing the springs to stretch and measure the goodness of the component match by the amount of stretching of the springs.

Another document layout includes gemLayout rhetorical structure theory to maintain semantic relationships between text segments (R. Henschel, J. Bateman, J. Delin, "Automatic Genre-Driven Layout Generation," Proceedings of KONVENS 2002, 6. Konferenz zur Verarbeitung naturlicher Sprache, DKFI, Saarbrucken, 2002.

A layout algorithm for constrained displays allowing user interactivity is LayLab in W. H. Graf, "The Constrained-Based Layout Framework LayLab and Its Applications," Proceedings of ACM Workshop on Effective Abstractions in Multimedia, Layout and Interaction, San Francisco, Calif., 1995.

The area of document summarization is focused on reflecting semantic importance of the text contained in a document. Approaches using dictionaries and specific language knowledge to determine significance of strings of characters are disclosed in U.S. Pat. No. 5,832,530, entitled Method and Apparatus for Identifying Words Described in a Portable Electronic Document, issued Nov. 3, 1998.

Text summarization for handheld devices is mainly applied to web pages. In O. Buyukkokten, H. Garcia-Molina, and A. Paepcke, "Text Summarization of Web pages on Handheld Devices," in *Proc. of 10th International WWW Conference, Hong Kong, China*, 2001, a web page, in a macro-level step, is divided into Semantical Text Units (STU) by using html/xml specific structures. In a second step, a micro-level summarization is performed by displaying a combination of only a limited number of lines, keywords, and the most significant sentence.

Y. Wu and D. Lopresti, "Resource-Optimized Delivery of Web Images to Small-Screen Devices," in *Proceedings of SPIE*, 2003, pp. 144–155, discloses preparing images in GIF format for reformatting for display on handheld devices. In the article, the size of the handheld display is fixed. The reformatting technique stores two resolutions of an image, and then performs a color reduction and codes the image in a way that requires little bandwidth for the transmission. The reformatting is done for only one fixed display.

In T. M. Breuel, W. C. Janssen, K. Popat, and H. S. Baird, "Paper to PDA," in *Proceedings of the International Conference on Pattern Recognition (ICPR'02), Quebec City, Quebec, Canada*, 2002, scanned documents are reformatted for display on a PDA. This work is focused on text with preservation of the reading order being the first goal.

S. Uchihasi and J. Foote, "Summarizing video using a shot importance measure and a framepacking algorithm," in *Proceedings of ICASSP*, 1999, pp. 3041–3044, discloses a method of video summarization that uses a shot importance measure and a packing algorithm for selected key frames. The importance measure selects the key frames and determines the size at which a key frame is to be displayed. The key frames are selected from a temporal sequence. The packing is performed by evaluation of a cost function in an optimization process.

An example of a technology for displaying symbolic documents (HTML documents) on constrained displays is "Opera Small-Screen Rendering.™."

Some layout problems are related to an optimization problem. First optimization problems will be described, then techniques for solving them will be described. An optimization problem includes an objective function to be maximized or minimized, unknowns (or variables) that effect the value of the objective function, and constraints that limit the allowed values of the unknowns. A solution that satisfies all constraints (without necessarily minimizing or maximizing the objective function) is called a feasible solution. Optimization problems may have multiple objective functions.

For the layout problem, examples of unknowns include position and scale for a particular area. Examples of constraints are that the position of a particular area must be within the canvas and that the scale must be greater than a minimum value. An example objective function is that the amount of the canvas covered by areas should be maximized.

Optimization problems can be classified into continuous and discrete. In a continuous optimization problem, all variables can take on any real value. Scale is an example of a continuous variable. In a discrete optimization problem, at least some of the variables can only have integer values. The decision whether to include an area or not and the relative location of areas (above/same/below, right/same/left) are examples of discrete variables.

Packing problems are applications of optimation problems. In general, objects of specified sizes must be packed into one or more spaces, or containers, etc. of specified size. An equivalent class of problems includes cutting problems where a material of specified size must be cut into objects of specified sizes.

Two-dimensional packing problems are most related to the layout problem. Many problems are formulated using rectangles for objects and spaces and requiring orthogonal placement (or placement/cuts parallel to an edge of the rectangular space). Some problems are limited to "guillotine cuts", cuts extending from one edge of the space or a previously cut rectangle to another edge.

Pallet loading (or palletization) is a two dimensional packing problem limited to rectangles and orthogonal placement. In this instance, pallet means a platform for transporting materials, not a set of colors. The goal is to maximize the number of objects that can be packed onto the pallet. This relates to a canvas with fixed width and height.

Two dimensional strip packing and bin-packing are problems also limited to rectangles and orthogonal placement. Both pack a given set of objects. If all the given set of objects are known at the start, the problem is called an off-line problem. If not all of the objects are known initially, the problem is called an on-line problem. Strip packing has a space that is fixed in one dimension and the goal of minimizing the other dimension. It is related to a canvas of fixed width and variable height. Bin-packing uses fixed size spaces (bins) and has the goal of minimizing the number of bins. Bin-packing with more than one bin is related to a layout problem with more than one canvas. In a computer job scheduling problem, one dimension (the fixed dimension for strip packing) can be memory required or other requirements and the other dimension can be time. In a VLSI test scheduling problem, one dimension (the fixed dimension for strip packing) can be the wires required or test vector size for a test and the other dimension can be time (see Vikram Iyengar, Krishnendu Chakrabarty and Erik Jan Marinissen, "On Using Rectangle Packing for SOC Wrapper/TAM Co-Optimization."

One-dimensional problems include the classical knapsack problem and one-dimensional bin-packing, where a two-dimensional knapsack problem is another name for a two-dimensional packing problem. Loading problems can be one dimensional or multi-dimensional with independent dimensions such as weight and capacity. Three-dimensional packing problems include container stuffing and pallet loading for objects that cannot be efficiently packed in layers.

The facility layout problem is a type of packing problem. See, Russell D. Meller and Kai-Tin Gau, "The Facility Layout Problem: Recent and Emerging Trends and Perspectives," Journal of Manufacturing Systems, Vol,. 15/No. 5 1996. Typically, the "objects" to be packed are departments (of unequal area) and they must be packed into facility such as a building. The goal is to minimize the material handling cost inside the building (or minimize the traffic between departments). Typically, the area of each object is fixed, but the width and length can vary within some range (i.e., the aspect ratio of the object can vary). (Reflow of text also similarly has approximately fixed area but variable width and length.) The block layout which specifies the relative location of each department is more relevant to the layout problem than the detailed layout which specifies aisle structures, input/output points, etc. Relative position can be a constraint. VLSI floorplanning and VSLI macro-cell layout are closely related to facility layout. Location problems include both facility layout and facility location (which ignore geometric constraints).

Now that optimization problems have been described above, techniques for solving are as follows.

Discrete optimization problems can be solved by exhaustive search when the number of possible values for all variables is small. For larger problems that can be decomposed into independent sub-problems, dynamic programming can be used.

Larger problems can be handled by branch-and-bound methodology. Branch-and-bound requires that all possible values for all variables sorted into a tree structure. At leaf nodes, an exact value for the objective function can be computed. At non-leaf nodes, a bound for the best case value of the objective function for all leaf-nodes that are in this non-leaf node's sub-tree can be computed. If the bound is worse than the current best solution, then all the possible variable values associated with this sub-tree can be ignored. The ordering of the tree structure is an important heuristic. If a good ordering and good bounds can be found for a particular problem, then the number of possibilities considered by branch-and-bound is much less than for exhaustive search.

Another technique for solving discrete optimization problems is to first relax the integer constraint and find the best continuous valued solution and then search only the closest integer solutions. Relaxation can be effective if the number of integer choices is large. Relaxation can also be used to find bounds in a branch-and-bound solution.

Continuous problems with linear constraints and a linear objective function can be solved with the simplex method or the interior-point methods. For non-linear objective functions, other techniques, such as quadratic programming which uses a quadratic approximation for the objective function may be used. See, Nicholas I. M. Gould and Philippe L. Toint, "A Quadratic Programming Bibliography." Convex problems can be solved by interior-point methods.

Solutions for a number of packing problems are summarized in Kathryn A. Dowsland and William B. Dowsland, "Packing Problems," European Journal of Operational Research, 56 (1002) 2–14, North-Holland. For strip packing, two simple algorithms are "level" and "shelf". Consider the width to fixed and height to be minimized. The "level" algorithm divides the space into rows with height equal to the first object placed in that row. "Level" is particularly appropriate when the object are sorted into decreasing height order. The "shelf" algorithm uses rows of height chosen out of a set of predetermined heights. "Shelf" can used when sorting is not possible. "Level" and "shelf" produce packing that are guillotineable and also further limited in that the packing can be obtained by first making horizontal guillotine cuts and then making vertical guillotine cuts. Such algorithms are sometimes referred to as 1.5 dimensional.

The "Level" algorithm used to solve packing problems is depicted in FIG. 1. Referring to FIG. 1, objects to be packed are sorted by height. The sorted objects would be packed in order into the strip. The first row 110 in the strip has a height equal to the first object 115 packed into the first row 110. When the first row 110 is filled with objects, the next object 125 in order is packed into a second row 120 with height equal to the next object 125. When the second row 120 is filled with objects, the next object 135 in order is packed into a third row 130 with a height equal to the next object 135. Then the third row 130 is filled with objects. The height of the strip is the sum of the heights of rows 110, 120 and 130. It should be noted that objects are rigid and may not undergo geometric manipulations such as scaling or cropping. Furthermore, the relative position of objects is arbitrary.

Bin packing problems can be solved by first solving a strip packing problem and then treating the fitting of each row into an appropriate bin as a one-dimensional problem.

There are two traditional approaches for exact solutions to facilities layout problems (see Russell D. Meller and Kai-Tin Gau, "The Facility Layout Problem: Recent and Emerging Trends and Perspectives," Journal of Manufacturing Systems, Vol. 15/No. 5 1996). One way is to model the problem as a quadratic assignment problem (QAP) and to solve the QAP with a branch-and-bound approach. A second way is to use a graph-theoretic approach. For this approach, the desirability of locating each pair of objects adjacent to each other is assumed to be known. Graph-theoretic approaches have multiple steps: the initial step considers if objects are adjacent and ignores area and shape while the final step produces a block layout meeting all constraints.

Heuristic solutions to facilities layout problems are often used because of the complexity of exact solution (see Russell D. Meller and Kai-Tin Gau, "The Facility Layout Problem: Recent and Emerging Trends and Perspectives," Journal of Manufacturing Systems, Vol. 15/No. 5 1996). CRAFT uses two-way or three-way exchanges chosen with steepest decent to improve an initial layout. LOGIC improves an initial layout based on a data structure that specifies whether objects are to the left, right, above, or below each other and does two-way exchanges of these relationships. FLEX-BAY is related to strip packing. Recent work includes Miguel F. Anjos, Anthony Vannelli, "A New Mathematical Programming Framework for Facility Layout Design", University of Waterloo Technical Report UW-W&CE#2002–4.

SUMMARY OF INVENTION

A method and apparatus for reformatting a document are disclosed. In one embodiment, the method comprises selecting a plurality of image segments having a plurality of attributes and determining a plurality of positions and a plurality of geometric operations to be performed on the plurality of image segments according to the plurality of attributes.

BRIEF DESCRIPTION OF DRAWINGS

Embodiments of the present invention will be understood more fully from the detailed description that follows and from the accompanying drawings, which however, should not be taken to limit the invention to the specific embodiments shown, but are for explanation and understanding only.

FIG. 3a shows a traditional thumbnail.

FIG. 16 shows example grid assignments for four areas and the height and width of each area at the current scale.

DETAILED DESCRIPTION

Figure 1:
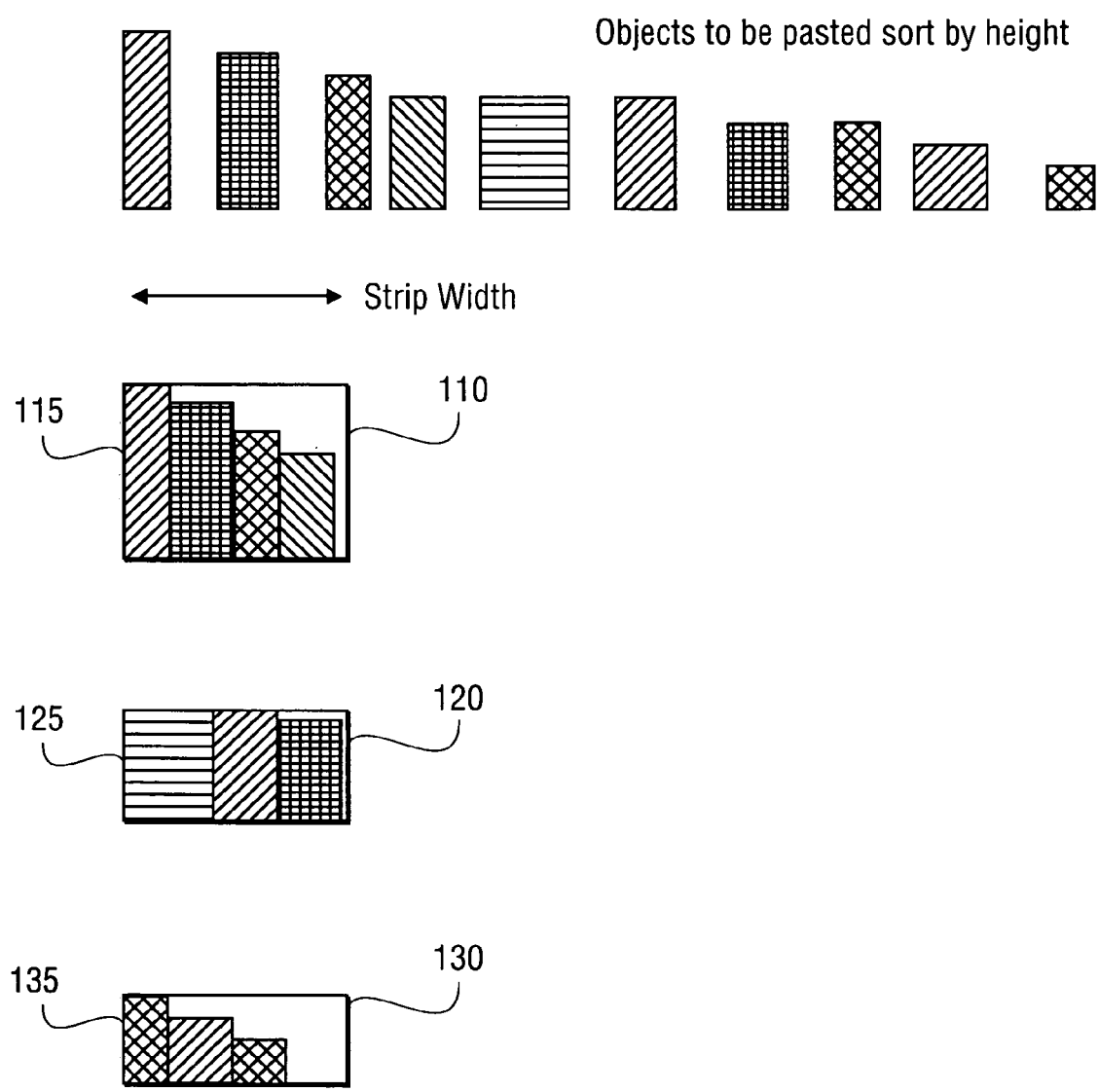
FIG. 1 illustrates packing objects with a level algorithm.

A method and an apparatus to perform a resolution sensitive layout in order to create a pictorial document representation are described. The following disclosure provides a framework for the layout problem for a two-dimensional display assuming resolution-sensitive segmentation results as an input. The techniques described herein perform a document layout in order to determine the appropriate resolution and placement of document segments. Segments are placed in a constrained display allowing the operations of scaling, cropping and changing the position between segments and with respect to the canvas. Examples are given of how to use that framework for reformatting of documents to fit small sized displays.

In the following description, numerous details are set forth, such as specific configurations, operations, etc., in order to provide a thorough understanding of embodiments of the present invention. It will be clear, however, to one of ordinary skill in the art, that these specific details may not be needed to practice every embodiment of the present invention. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Input Data

In one embodiment, the segmentation results of a document are received. The segmentation results provide a description of the document in terms of segments of the document that each forms a unit in some metric that was used by the segmentation algorithm to segment the document. Each of those segments is characterized by a geometric area A and an image intensity value given by a function $f_A$ on A. The entire segment is then characterized by the pair $S=(A, f_A)$. The segments can be subdivided into smaller segments creating a hierarchical tree of segments. If only one level of subdivision is performed, the segments that are generated after subdivision are called fragments.

One way of obtaining the input data is to use the results from text-based analysis or wavelet analysis as described in U.S. Patent Applications for "Reformatting Documents Using Document Analysis Information", "Content and Display Device Dependent Creation of Smaller Representations of Images" and "Header-Based Processing of Images Compressed Using Multi-Scale Transforms," (U.S. patent application Ser. Nos. 10/354,811, 10/044,603 and 10/044,420), which are incorporated herein by reference, and assigned to the assignee of the present invention. Wavelet analysis uses JPEG2000 ("J2K") header data to compute a multi-resolution segmentation map, separates the segmentation map into connected components, and assigns the resolution and importance attributes to each component. The resolution attribute describes the optimal resolution for a given component from a coding point of view. The importance attribute indicates the number of bits spent by the coder on the component at the optimal resolution.

In one embodiment, layout analysis information obtained from document layout analysis software (which may be part of document analysis or optical character recognition ("OCR") software) is used to locate bounding boxes of groupings of text. These groupings are structured into text zones, text lines, and words. Each text zone has attributes of resolution and importance. In contrast to the JPEG 2000-based attributes from the wavelet analysis, the resolution attribute is derived from the font size of the text inside the bounding box, and the importance value is derived from the font size combined with position of the box on the page.

The outputs of image and document analysis may be merged into one resolution-sensitive segmentation result.

In the following disclosure, it is assumed that an area has rectangular shape. However, one should appreciate that the techniques disclosed herein are applicable to areas of different shapes. In this rectangular case, an area is described by parameters, two of which are the x dimension of rectangle and the y dimension of rectangle. In one embodiment, each segment has attributes assigned to it. Attributes may be separated into required and optional attributes. In one embodiment required attributes include preferred resolution and importance value (e.g., entropy). In one embodiment, optional attributes include segment type (e.g., text or image), alignment (e.g., centered, left, or right), positioning attributes (with respect to the areas) including anchor point of segment, relative positioning (e.g., top, bottom, left, right), and reading order, one or more control inputs including an indication of whether to convert absolute locations into relative locations or not, tolerance intervals in relative positioning (e.g., allowing N errors in positioning), and an indication of whether all or some percentage or portion of segments have to be placed into the canvas or a subset is allowed to be visible (and others not), and additional meta data (e.g., preserve color or allow colors to go away, an indication of whether rotation is allowed or not, keywords or phrase found in an area, etc.).

In one embodiment, those segmentation results are made available as inputs in form of a segment description list, describing segments and their attributes. An example of a segment description list is given in Table 1. The explanation for the column entries is listed following Table 1.

TABLE 1

Example input list to layout framework

| seg # | frag# | res | xloc | yloc | xdim | ydim | importance value | text flag | align |
|---|---|---|---|---|---|---|---|---|---|
| 0 | 0 | 2 | 192 | 160 | 432 | 304 | 0.115092 | 0 | 0 |
| 1 | 0 | 2 | 288 | 512 | 288 | 96 | 0.021083 | 0 | 0 |
| 2 | 0 | 2 | 393 | 153 | 188 | 12 | 0.010687 | 1 | 0 |
| 2 | 1 | 2 | 394 | 154 | 38 | 12 | 0.002256 | 1 | 0 |
| 2 | 2 | 2 | 439 | 154 | 68 | 12 | 0.004097 | 1 | 0 |
| 2 | 3 | 2 | 513 | 154 | 66 | 12 | 0.003858 | 1 | 0 |
| 3 | 0 | 2 | 160 | 608 | 64 | 224 | 0.004214 | 0 | 0 |
| 4 | 0 | 4 | 0 | 16 | 96 | 192 | 0.003546 | 0 | 0 |
| 5 | 0 | 2 | 384 | 32 | 208 | 96 | 0.003415 | 0 | 0 | col 1: segment number
col 2: fragment number
col 3: downsampling factor to preferred resolution
col 4: x location of area
col 5: y location of area
col 6: x dimension of area
col 7: y dimension of area
col 8: importance value of fragment
col 9: type (1=text, 0=image)
col 10: alignment–centered=1, non-centered=0

In one embodiment, in addition to the segment description list, the pixel dimensions of the original document, $d_{xdim}$ and $d_{ydim}$, and the pixel dimensions of the output canvas, $c_{xdim}$ and $c_{ydim}$, are included as inputs.

The document itself can also be viewed as a segment with segment area D. The target canvas has area C. Using these notations, the document area is described by $D=(d_{xdim}, d_{ydim})$ and the canvas area $C=(c_{xdim}, c_{ydim})$. The document itself is described by $(D, f_D)$ and the thumbnail by $(C, f_C)$.

The importance value, denoted by I herein, in the input list describes the amount of information contained in the specific segments. In one embodiment, the importance value represents the entropy of the segment at a preferred resolution of the segment as determined by an image coder. In one embodiment, preferred resolution is the lowest resolution where text is readable. In one embodiment, preferred resolution is the lowest resolution where image content is recognizable. Preferred resolution may be determined using the method described in "Header-Based Processing of Images Compressed Using Multi-Scale Transforms," U.S. patent application Ser. No. 10/044,420, assigned to the corporate assignee of the present invention.

As an example, the importance value of the first segment from Table 1 is $I(S_0)=0.115092$. Other embodiments may use other metrics for importance, information content, entropy or relevance.

A segment $S=(A, f_A)$ at its preferred resolution $r(S)$ is defined as the result of extracting the resolution via a resolution operator r, where r is expressed as $$r(S)=(\tilde{A}, f_{\tilde{A}}).$$

A collection of areas $A_i$ is notated by $A=\cup_i A_i$.

In one embodiment, the dimension and location of rectangle inputs are integers. In another embodiment, for a layout process referred to as the non-greedy layout process, these inputs are real values (e.g., the inputs are converted to floating point). Also the anchor points (if available) are the centers of the rectangle. Therefore, if, for example, the corners closest to the origin (e.g., upper left) are provided, they are converted to centers by adding half of the rectangle width to the X corner location and half of the rectangle height to the Y corner location.

In one embodiment, the non-greedy layout process uses one of three types of initial location information (constraints). The first type is that no initial location is used. This is chosen if the location in an initial layout is not specified. This first type may also be chosen if not preserving the spatial layout of the original is desired. In one embodiment, the non-greedy layout assigns locations to increase, and potentially maximize, importance.

The second type involves relative locations. In one embodiment, the non-greedy layout process preserves the top-to-bottom and left-to-right (or north-to-south and east-to-west) order of areas. Other possible relations are described by the interval algebra (J. Allen, "Maintaining Knowledge about Temporal Intervals," Communications of the ACM, Vol. 26, pp. 832–843, 1983). All relative information specifications can be required (N=0 errors), or N errors for N>0 can be allowed. If the number of errors, N, is sufficiently large, then the results are the same as if no initial locations are used. Absolute locations may be converted to relative locations by comparing the locations of the edges of pairs of areas. Alternatively, a relative location can indicate something other than original page locations, much as, for example, areas representing World Wide Web (WWW) pages that are linked could be related top-to-bottom.

The third type involves absolute locations. In one embodiment, the non-greedy layout process preserves the locations of centers of areas and determines only the sizes of areas.

In one embodiment, additional types of location information may be used, such as, for example, 1D order (e.g., reading order, time, etc.). In this case, areas are mapped in some pattern (e.g., right to left, top to bottom for English reading order; top to bottom, right to left for Japanese reading order, clockwise around the page, etc.).

In one embodiment, absolute location information are converted into relative location information and relative location errors (N=0) are not allowed. Whether or not anchor point locations are input, the output contains anchor point locations.

In one embodiment, anchor point locations are in coordinates in a reference resolution. Given the preferred resolution for all areas, the highest resolution of these may be used as the reference resolution. Alternatively, the original input image resolution, canvas resolution or other resolution may be used instead. Anchor point locations are converted to reference resolution coordinates if necessary.

In one embodiment, the non-greedy layout process normalizes the scale associated with the preferred resolution, the preferred scale, to 1.0 for each area. The dimensions of the rectangle are converted so that they are scaled by the preferred scale. This scale value of 1.0 of the converted dimensions is the maximum size for the area. In an alternative embodiment where preserving white space was not desired, the scale could be allowed to exceed 1.0. (If the preferred scale is not normalized to 1.0, then alternatively, the scale can be normalized in the cost function.)

Note that if a feasible layout (e.g., one that satisfies the location constraints) with all areas at their preferred scale is found, this is an "ideal" solution. If the canvas is at least as big as the image scaled to the maximum of all preferred resolutions, then a traditional thumbnail will be an "ideal" solution. In one embodiment, the canvas is significantly smaller and the solution does not include some areas and/or scales some areas less than the desired resolution. For these significantly smaller canvases, the solutions described herein are better than traditional thumbnails.

In one embodiment, for each area, the minimum scale is determined. Typically, the scale that is used in a traditional thumbnail is chosen as the minimum scale. Alternatively, twice the scale that is used in a traditional thumbnail can be chosen as the minimum scale. If the scale for each area is normalized, such that 1.0 corresponds to the preferred scale, the minimum scale differs for areas with different preferred scales.

Figure 2:
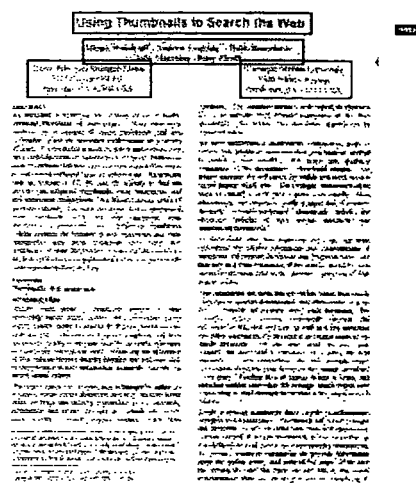
FIG. 2 examples of inputs.
Figure 2:
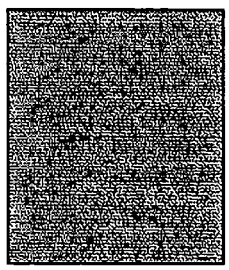
Figure 3B:
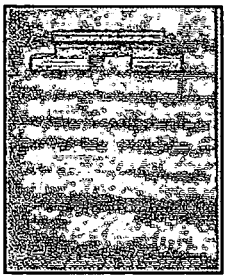
FIG. 3b shows an example output where absolute locations are used and a subset of the areas to be included where chosen.
Figure 3B:
Figure 3C:
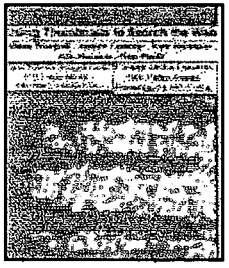
FIG. 3c shows an example output where relative locations (with no error permitted with respect to top-to-bottom or left-to-right relationships) are used.
Figure 3D:
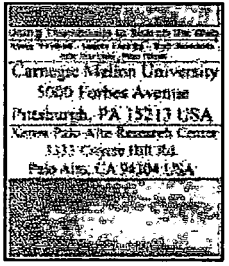
FIG. 3d shows an example output where relative locations with at least 2 errors are permitted (or equivalently where location information is not used).

FIG. 2 shows an example of inputs, including an image and a display canvas. The inputs shown in FIG. 2 are reformatted into various output images in one embodiment. The various output images are shown in FIGS. 3a–3d. FIG. 3a shows a traditional thumbnail. FIG. 3b shows an example output where absolute locations are used and a subset of the areas to be included were chosen. FIG. 3c shows an example output where relative locations (with no error permitted with respect to top-to-bottom or left-to-right relationships) are used. FIG. 3d shows an example output where relative locations with at least 2 errors are permitted (or equivalently where location information is not used).

Referring to the example of inputs shown in FIG. 2, the input file describing the input image consists of a first line, "3360 4382", which contains the page width and the page height. Each of the remaining lines has information for one area. It should be noted that this example in FIG. 2 has no fragments. Other examples may include fragments. In one embodiment, this information includes the area ID, a "0" indicating that these are areas not subdivided into fragments, the preferred resolution, and the X position of the area in the page at the reference resolution, the Y position, the width at the preferred scale, the height, and the importance of the corresponding segment. The canvas size is described as one like "130 160" which is the width and height." Alternative embodiments include more or less information.

Consider the first area (area ID=0). On the original page, it has a width equal to 1712, a height equal to 104, the X position of the left edge is equal to 776, and the Y position of the top edge is equal to 432. For this area, the preferred resolution is 3 so the unnormalized preferred scale for this area is $2^{-3}=\frac{1}{8}$. Normalizing the preferred scale to 1.0 results in a width of (1712/8=) 214 and height of (104/8=) 13. The minimum preferred resolution is 2 (i.e., the minimum over all areas), so this is the reference resolution, corresponding to a reference scale of $2^{-2}=\frac{1}{4}$. The X position of the center (not left edge) at the reference resolution is ((776+1712/2/4=) 408 and the Y position of the center (not top edge) at the reference resolution is ((432+104/2/4=) 121. The conversion for the other three areas is similar.

Layout Operations Performed On Areas

In one embodiment, in order to fit document segments in the final display, three operations are allowed to be performed on the segment areas: scaling, cropping, and positioning.

Scaling

Scaling is an operation that changes the size and/or aspect ratio of an area. In one embodiment, scaling is defined as multiplying a two-dimensional vector (x, y) component-wise with scale factors $s_x$, $s_y$ respectively, and is represented as follows:

$$s: \left\{ \begin{array}{c} R^2 \to R^2 \\ (x, y) \mapsto (s_x \cdot x, s_y \cdot y) \end{array} \right\}$$

Scaling the entire image area D to the canvas size C creates a traditional thumbnail area. In one embodiment, a scale factor $s_c$ is determined as:

$$s_c = \min\left(\frac{c_{xdim}}{d_{xdim}}, \frac{c_{ydim}}{d_{ydim}}\right)$$

and the scaling operation on the document area D is performed by $$s((d_{x\ dim}, d_{y\ dim})) = (s_c \cdot d_{x\ dim}, s_c \cdot d_{y\ dim}).$$

The trivial scaling is performed when choosing $s_x=s_y=1$. Scaling by ½ in the x-direction and 1 in the y-direction is performed by choosing $s_x=0.5$ and $s_y=1$.

In order to exclude scaling operations that lead to degenerated deformations, e.g., $s_x=0$ and $s_y=1$, the following constraint is given:

$$t_1 \leq \frac{s_x}{s_y} \leq t_2,$$

with thresholds $t_1$ and $t_2$ that satisfy $0 < t_1 \leq t_2 < \infty$.

In one embodiment, scaling of image content is performed by computing a lower resolution version of the intensity function and of a segment over a smaller (scaled) area.

Examples of software that performs scaling of images include "Photoshop" by Adobe of San Jose, Calif. and "pnmscale" from http://netpbm.sourceforge.net/.

Cropping

Cropping of areas is defined as subtracting some area part B from the area A, i.e. computing A\B.

$$c: \begin{cases} A \times A \to A \\ (A, B) \mapsto A \backslash B \end{cases}$$

A new anchor point of the cropped area may have to be determined.

In one embodiment, cropping is subtracting the area of one pixel from A (pixel-wise cropping). Another cropping is to subtract A completely. In the later case, the resulting set after cropping is empty.

In one embodiment, the trivial cropping operation is performed when setting B=∅. In this case, no cropping is performed.

Figure 25A:
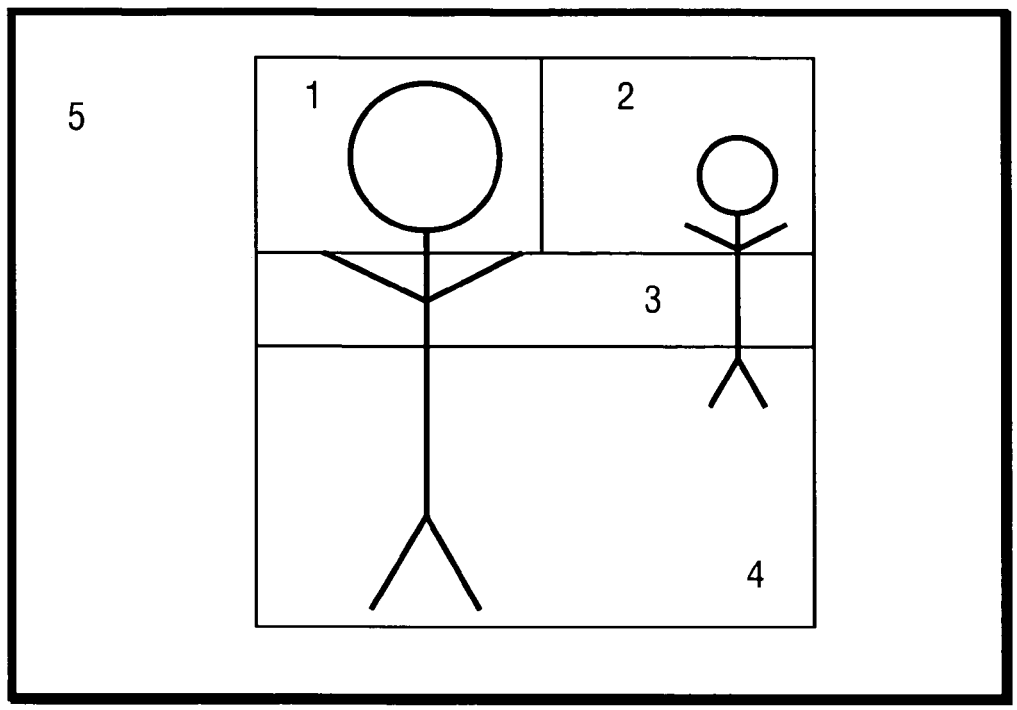
FIGS. 25A and 25B illustrates examples of segmented images.
Figure 25B:
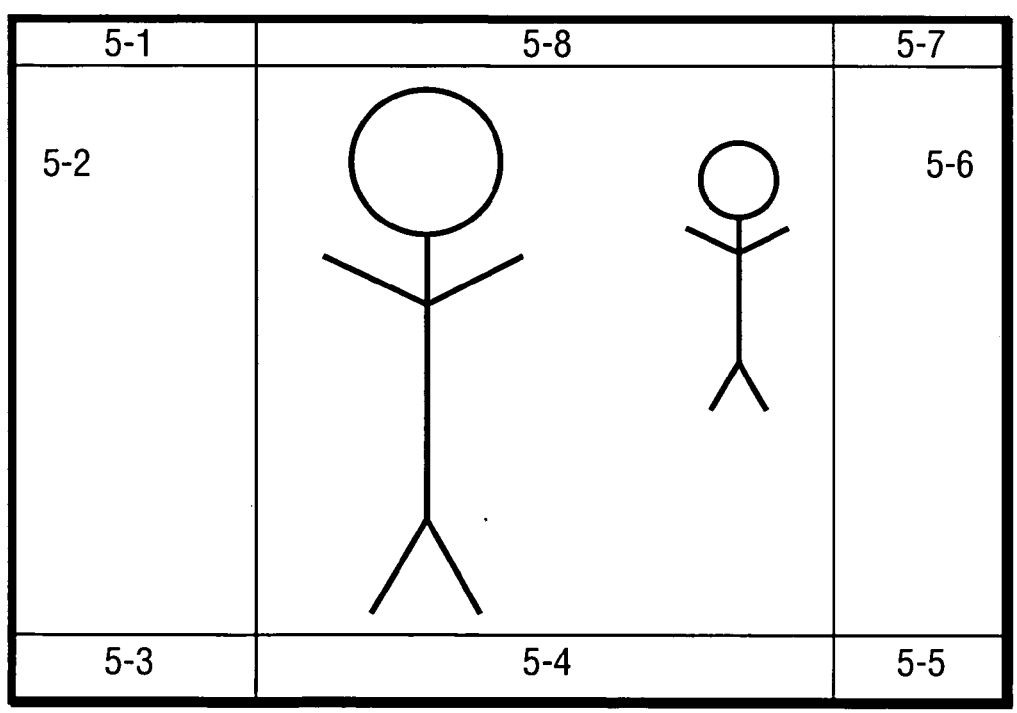

Cropping of an area is defined as subtracting subsets from the area. These subsets can be given as a list of fragments in reading order, or as a list of objects describing the images, listed by the importance order, e.g. in images containing people faces are typically more important than background. Cropping then means subtracting a fragment or object, typically successively starting from the end of the list, i.e. starting with the last word for text fragments or with the least important image object for image fragments. FIG. 25A shows an example of an image segment with an area subdivided into fragments. The fragment ranking is given by the numbers in the rectangles. One cropping example is to subtract fragment 5 and keep fragments 1–4. Another example is to subtract fragments 2–5 and keeping only fragment 1. It is also possible of having additional freedom of choosing fragment for cropping out of a set of fragments in arbitrary order. FIG. 25B shows an example where the background area 5 from to top figure is subdivided into fragments 5-1, . . . , 5-8. These fragments form a set and rectangles out of this set could be chosen for cropping in arbitrary order, e.g. first the set 5-1, 5-2, 5-3 or 5-1, 5-8, 5-7.

Other examples for cropping include cropping while preserving the aspect ratio, margin cropping, and cropping to fit a template.

Cropping of image content is an image processing operation that typically extracts a portion (e.g., a rectangular portion) of an image. Examples of software that performs cropping on images include "Photoshop" by Adobe of San Jose Calif. and "pnmcut" from an open source software package distributed by SourceForge.

Positioning

Positioning is defined as moving an area with respect to a reference and denoted by the operator p. In one embodiment, positioning comprises mapping an area anchor point to a new location with respect to a reference point. Several examples are given below.

$$p: \begin{cases} R^2 \times R^2 \to R^2 \\ ((x, y), (r_x, r_y)) \to (p_x, p_y) \end{cases}$$

In one example, an area A with anchor point q(A) is positioned at its original position in the document if the reference point is the anchor point of the original document D and the mapping is the trivial mapping, $p(q(A),q(D))=q(A)$.

The position of a fragment area B inside of the corresponding segment area A with respect to the anchor point of A is given by $p(q(B),q(A))=q(B)-q(A)$.

If relative positioning is desired, the outcome could be a pair (left/right, top/bottom).

The version of an area A that is finally being placed (laid out) on the canvas is notated by Λ(A). It is characterized by scaling a cropped version c(A,B) of the original area by applying s and positioning the anchor point at p(q(s(c(A,B)), C)).

Examples of software that performs placing an area onto a canvas include "Photoshop" by Adobe of San Jose, Calif. and "pnmpaste" from http://netpbm.sourceforge.net/.

Cropping and scaling are geometric operations on areas. In contrast, positioning is a spatial operation.

Document Processing in Three-dimensional Parameter Space

Various other image processing operations can be described in terms of the three operations described above, namely, scaling, cropping, and positioning.

Reflow can be done by performing a non-trivial positioning operation. In reflow, the position of areas change with respect to each other and to the anchor point of the document. If only a change in positioning is performed, trivial mappings for scaling and cropping are applied.

In one embodiment, for white-space removal, non-trivial mapping for positioning one area with respect to other areas may be applied. Without any other operations, a trivial mapping for scaling and cropping is performed.

In one embodiment for enlargement, a non-trivial scaling may be performed. In addition, a change in positioning may be desired. If a positioning change is desired, a non-trivial mapping for positioning may be applied, with trivial cropping being performed as well.

To change aspect ratio, a scaling operator s may be applied with $s_x \neq s_y$. If a change of the aspect ratio is performed for a segment containing several fragments by relocating fragments, then the fragments may also have a change in positioning.

Reformatting in the three-operation parameter space usually involves a change in positioning. In one embodiment, in order to perform reformatting, images may be downsampled. Therefore, scaling and positioning operations can also perform reformatting.

In document summarization, usually not all segments of the original document are kept, but only those that seem to be most important to the person or algorithm that performed the summarization. This discarding of segments is a non-trivial cropping in the three-operation space. Also, a reformatting of the non-discarded areas may be performed, i.e. non-trivial scaling and positioning is performed.

A summarization of the relations between document processing steps and layout operations is given in Table 2 with $0 \leq \alpha, \beta \leq 1$ and $\gamma \geq 0$.

TABLE 2

Document processing tasks in layout operation space.

| parameters | scaling | cropping | change of position |
|---|---|---|---|
| reflow | 1 | 0 | α |
| cropping | 1 | β | 0 |
| traditional scaling | γ | 0 | 0 |
| white-space removal | 1 | 0 | α |

TABLE 2-continued

Document processing tasks in layout operation space.

| parameters | scaling | cropping | change of position |
| --- | --- | --- | --- |
| enlargement | γ | 0 | α |
| change of aspect ratio | γ | 0 | α |
| reformatting | γ | 0 | α |
| summarization | γ | β | α |
| ... | | | | where γ indicates non-trivial scaling, β indicates non-trivial cropping and α indicates non-trivial change of position. Note that a 1 in the scaling column indicates no scaling, a 0 in the cropping column indicates no cropping, and a 0 in the change of position column indicates no change in position.

2D Layout as Optimization Problem in Layout Operation Space

In one embodiment, to layout an image, the best fit of a set of image segments of the image is computed from the three types of layout operations performed on each image segment, namely scaling, cropping, and positioning. The quality of a possible fit may be measured by a cost function. In such a case, the best fit may be the one that results in the lowest cost. In this way, the layout problem is formulated as an optimization problem involving a cost function.

For optimization problems, identical solutions can be found by having "conditions that are not allowed" as constraints or conditions causing the cost function to be infinity. Large, but not infinite values for the cost function may also be used in some cases. In the follow discussion of cost functions, conditions that cause the cost function to be infinite may alternatively be implemented as constraints.

The Cost Function

Each of the operations performed on an area may result in a distortion of the segment position in the original document, where distortion=change of importance after cropping and/
or scaling+change in relative positioning of a
segment. (7)

Therefore, in one embodiment, to each of the area operations a penalty is assigned and captured in a cost function that depends on the area collection $\{A_i\}$ and collections of scaling (s), cropping (c), and positioning (p) operations performed for each area $A_i$. In one embodiment, the cost function is expressed as:

Cost=Cost($\{A_i\},\{s_i,B_i,p_i\}$), where B is the cropped set.

This cost function may be used in an optimization framework to determine the 'best' combination of area operations for all areas. The optimal solution is defined as a vector of 3-tuplets ($\{s_i^*, B_i^*, p_i^*\}$) with $$(\{s_i^*, B_i^*, p_i^*\}) = \arg\min_{\{s_i; B_i; p_i\}} \text{Cost}(\{A_i\}, \{s_i, B_i, p_i\}),$$

where B is the cropped set.

As stated in Equation (7), the change in placement of a segment after positioning it by the operator p is measured with respect to a reference position (e.g., the origin of the display or the anchor point of another segment). In one embodiment, this is measured by a distance metric d. In the following, it is assumed that d is the Euclidean distance. Another choice could be to measure differences in relative position relations (e.g., top, bottom, left, or right).

The change introduced by scaling and cropping is measured by the amount of scaling and cropping.

Examples of Cost Functions

Depending on the application, the cost function may put different weightings on the three parameters of scale, crop, and position, or link them together via specific operations. In the following, several types for relations between the layout operations and the importance variable are shown.

An additive cost function in which the importance influences all three parameters is:

$$\text{Cost} = \text{importance} \cdot \left(\frac{1}{\text{scale}} + \frac{1}{\text{crop}} + \text{distance}\right).$$

where crop measures the ratio between the size of the cropped area and the entire area size and scale measures $s_x \cdot s_y$.

An additive cost function in which the positioning is not influenced by the information variable is $$\text{Cost} = \text{importance} \cdot \left(\frac{1}{\text{scale}} + \frac{1}{\text{crop}}\right) + \text{distance}.$$

A cost function of this type may then be expressed as follows:

$$\text{Cost}(\{A_i\},\{s_i, B_i, p_i\}) = \text{Cost}[I(s(c(\tilde{A}_i,\tilde{B}_i)),$$
$$\tilde{f}_{s(c(\tilde{A}_i,\tilde{B}_i))},)),d(p_1,p_2)]. \quad (10)$$

A cost function with multiplicative relation between scale and crop operations is $$\text{Cost} = \text{importance} \cdot \left(\frac{1}{\text{scale}} \cdot \frac{1}{\text{crop}} + \text{distance}\right).$$

A cost function with multiplicative relation between scale and crop operations, in which positioning not influenced by an information variable, is $$\text{Cost} = \text{importance} \cdot \frac{1}{\text{scale}} \cdot \frac{1}{\text{crop}} + \text{distance}.$$

A complete multiplicative cost function is $$\text{Cost} = \text{important} \cdot \frac{1}{\text{scale}} \cdot \frac{1}{\text{crop}} \cdot \text{distance}.$$

Additional weightings can be included in the cost function. For example, in one embodiment, the cost function is $$\text{Cost} = \text{important} \cdot \left(\lambda \cdot \frac{1}{\text{scale}} + \mu \cdot \frac{1}{\text{crop}} + \upsilon \cdot \text{distance}\right)$$

with λ, μ, υ ≧ 0.

Using cost functions with appropriate weights, a smooth transition between scaling, cropping, positioning, and therefore between the document processes performed as document processing in the 3-dimensional parametric space is possible.

Single-Area Cost Function for a Greedy Layout Process

It is assumed that each segment (A, $f_A$) has a positioning attribute in the form of an anchor point q(A) with respect to a reference origin. In one embodiment, the anchor point is the upper left corner. Alternatively, the anchor point may be another location such as the lower left corner or the center point.

In a greedy layout process, which is described in one detail below, processing occurs one area at a time, and the cost function is evaluated for a given segment and depends on all previously placed segments. In one embodiment of the greedy algorithm, once a segment is placed, its layout cannot be altered. The following shows an example using a cost function with multiplicative relation between scaling and cropping operations, where positioning is not influenced by an information variable. Since segments are placed successively, the importance value can be seen as a constant for each segment.

$$\text{Cost}(A_i, s_i, B_i, P_i) = \begin{cases} \infty, \text{ if } & (i)\ s_{x,i} \cdot s_{y,i} \langle (s_{\min})^2, \text{ or} \\ & (ii)\ I(c(\tilde{A}_i, \tilde{B}_i), \tilde{f}_{c(\tilde{A}_i, \tilde{B}_i)}) \rangle \varepsilon, \text{ or} \\ & (iii)\ \left[\left(\bigcup_{j<i} \Lambda(A_j)\right) \cap \Lambda(A_i) \neq \phi \right. \\ I(\tilde{A}_i, \tilde{f}_{\tilde{A}_i}) \cdot \left[s_{x,i} \cdot s_{y,i} \cdot \left(1 - \frac{B_{x\dim} \cdot B_{y\dim}}{A_{x\dim} \cdot A_{y\dim}}\right)\right]^{-1} + \\ d[p(\min(s_{x,i}, s_{y,i}) \cdot c(\tilde{A}_i, \tilde{B}_i), \Lambda(A_{j0}), s_c \cdot \\ [q(c(\tilde{A}i, \tilde{B}i) - q(c(\tilde{A}_{j0}, \tilde{B}_{j0}))]], \text{ otherwise} \end{cases}$$

where $j_0$ is the index of the area placed last before placing the current area $A_i$ and $\varepsilon \geq 0$. The scaling is $s_i$, the cropping is $B_i$, and the position is $p_i$.

Condition (i) $s_{x,i} \cdot s_{y,i} \langle (s_{min})^2$ checks whether the required scaling factor is too small. In that case, the penalty should be very high which is realized by setting the value of the cost function to ∞. Condition (ii) $I(c(\tilde{A}_i, \tilde{B}_i), \tilde{f}_{c(\tilde{A}_i, \tilde{B}_i)}) \in$ checks whether there is still information contained in the cropped segment. If the segment is empty or has very little importance, i.e., I<$\varepsilon$, then the cost is set to ∞. Condition (iii) $\lfloor(\bigcup_{j<i}\Lambda(A_j)\rfloor \cap \Lambda(A_i) \neq \emptyset$ checks whether the positioning is performed such that the cropped and scaled area does not overlap with the already placed area(s). Therefore, the third condition checks the available free space.

The distance d measures differences in relative positions between the current area $A_i$ and the previously placed area $A_{j0}$ in the tested layout and the traditional thumbnail.

In one embodiment, the non-greedy layout process uses $$\text{cost} = \frac{k_1}{(\text{scale}+k_2)^2}$$

where $k=i \cdot I_a$.

The parameter i is an arbitrary weight (e.g. 1.0) and $I_a$ is the importance attribute of a particular area. In one embodiment, cropping is ignored. It should be noted that other embodiments may include cropping.

For the parameter $k_2$, $k_2=0$ results in the preferred resolution having equivalent cost for areas with different preferred resolution. For $k_2=(-\text{minscale}(s_{min})+1)$, the minimum resolution has equivalent cost for areas with different preferred resolution.

The actual cost function is not used in a non-greedy layout process. Instead the derivative or slope of the cost function and the inverse of this function are used. The derivative with respect to scale is:

$$\text{slope} = \frac{\partial \text{cost}}{\partial \text{scale}} = \frac{2k_1}{(\text{scale}+k_2)^3} \quad (4)$$

Solving the above equation for scale results in the inverse equation:

$$\text{scale} = \sqrt[3]{\frac{-2k_1}{\frac{\partial \text{cost}}{\partial \text{scale}}}} - k_2 = \sqrt[3]{\frac{-2k_1}{\text{slope}}} - k_2$$

Figure 4A:
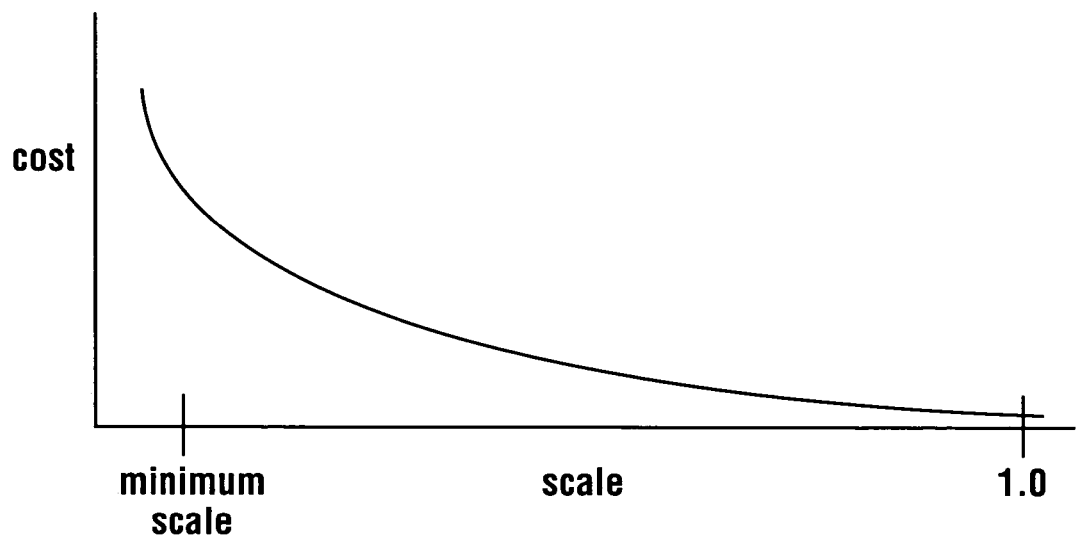
FIG. 4 shows two conceptual cost functions.
Figure 4B:
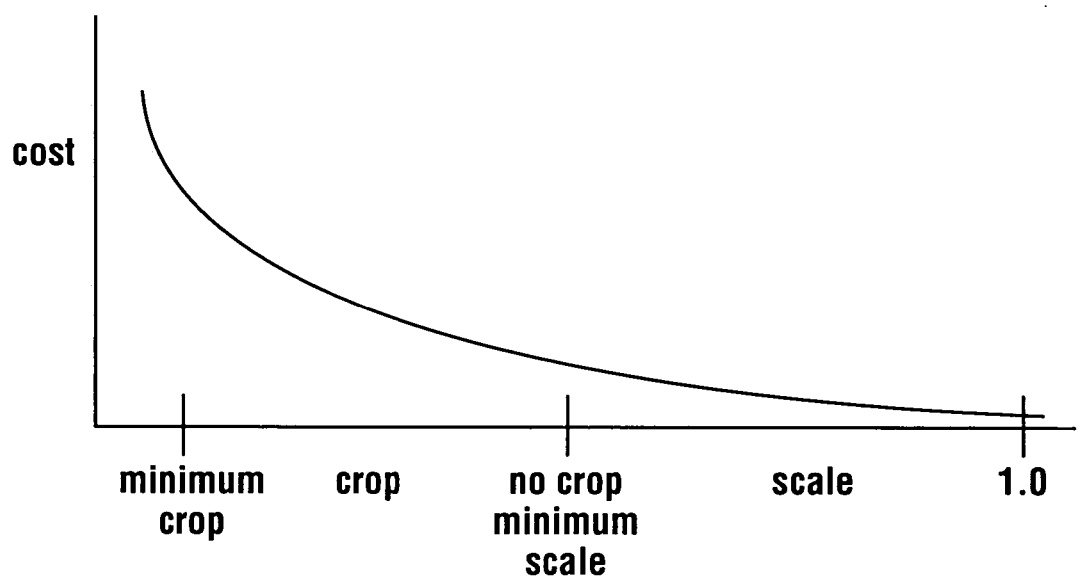

If cropping or other manipulations affecting cost are done, the corresponding slope functions and inverse functions could be used. FIGS. 4A and 4B show exemplary cost functions. Cost decreases as scale increases (or as the effect of other manipulations such as cropping decreases). Cost decreases more rapidly for small values of scale (high distortion for other manipulations) and less rapidly for large scales (lower distortion for other manipulations) so that less important areas have a chance to be considered. The combination of scaling and cropping into a single "distortion" access is for illustration only, and should not limit the scope of the present invention.

Multi-Area Cost Function for a Non-Greedy Method

In one embodiment of a non-greedy layout process, each segment is placed under consideration of all possible placements for all other segments. In the following, a cost function with multiplicative relation between scaling and cropping operations and an additive solution are used for measuring the mutual relations between segments.

$$\text{Cost}(\{A_i\}, \{s_i, B_i, P_i\}) =$$

$$\begin{cases} \infty, \text{ if } & (i)\ s_{x,i} \cdot s_{y,i} \langle (s_{\min})^2, \text{ or} \\ & (ii)\ I(c(\tilde{A}_i, \tilde{B}_i), \tilde{f}) \rangle \varepsilon, \text{ or} \\ & (iii)\ \left[\left(\bigcup_{j \neq i} \Lambda(A_j)\right) \cap \Lambda(A_i) \neq \phi \right. \\ \sum_i I(\tilde{A}_i, \tilde{f}_{\tilde{A}_i})) \cdot \left[s_{x,i} \cdot s_{y,i} \cdot \left(1 - \frac{B_{x\dim} \cdot B_{y\dim}}{A_{x\dim} \cdot A_{y\dim}}\right)\right]^{-1} + \\ \sum_{j, i \neq j} d[p(\min(s_{x,i}, s_{y,i}) \cdot c(\tilde{A}_i, \tilde{B}_i), \min(s_{x,j}, s_{y,j}) \cdot \\ c(\tilde{A}_j, \tilde{B}_j)) - p(s_c \cdot c(\tilde{A}_i, \tilde{B}_i), s_c \cdot c(\tilde{A}_j, \tilde{B}_j))], \text{ otherwise} \end{cases}$$

Similar to the description above, the conditions (i), (ii), and (iii) are responsible for checking allowed scaling, non-empty information content and available free space, respectively.

The distance d measures differences in relative positions between the current area $A_i$ and another placed area $A_j$ in the tested layout and the traditional thumbnail.

Output Data

In one embodiment, the output of the layout process is a list that contains crop and scale instructions with respect to the original document, as well as paste instructions with respect to the target canvas. This list allows an image composition program or image generator to extract the required segments from the image, scale them and paste them onto the canvas. In one embodiment, the image composition program comprises a concatenation of "pnmcut," "pnmscale" and "pnmpaste" commands. In another embodiment, the image composition program includes a J2K-decoder for partial scaling and cropping. An example of a layout composition list is given in Table 3.

TABLE 3

Example a layout composition list.

| scaling instruction | crop instructions | | | | paste instructions | |
| --- | --- | --- | --- | --- | --- | --- |
| scale | xloc1 | yloc1 | xdim | ydim | xloc2 | yloc2 |
| 0.0752315 | 96 | 80 | 216 | 152 | 0 | 24 |
| 0.11284725 | 144 | 256 | 144 | 48 | 0 | 115 |
| 0.25 | 394 | 154 | 38 | 12 | 62 | 0 |
| 0.25 | 439 | 154 | 68 | 12 | 62 | 12 |

Figure 5:
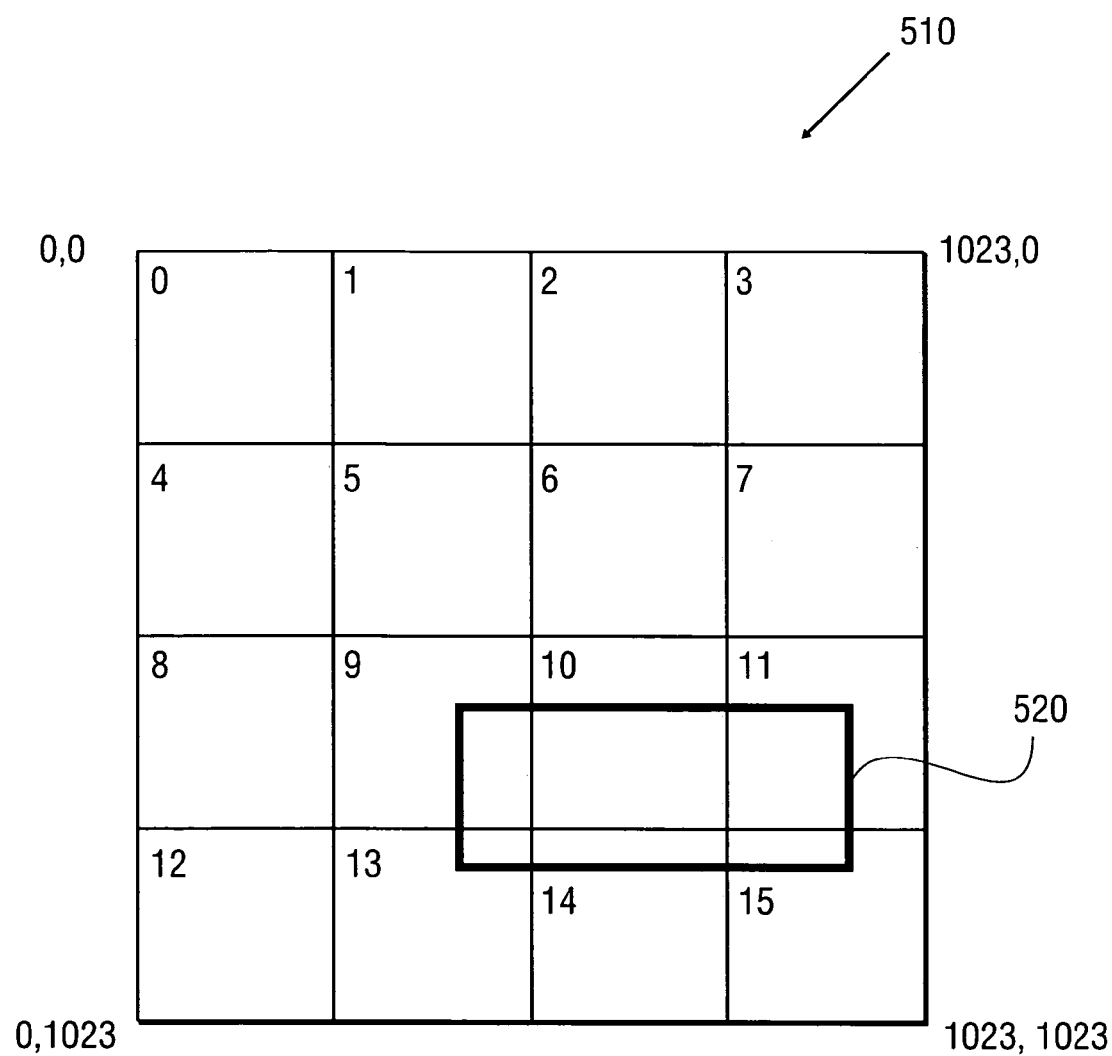
FIG. 5 shows an example of a 1024×1024 image.

For example, consider a 1024×1024 image 510 shown in FIG. 5 compressed with JPEG 2000 with 256×256 tiles and 5 wavelet-transform levels. Consider cropping out the rectangle 520 with corners 400,600 and 900,800 and scaling this by ⅙ in both dimensions. The 6 tiles composing the rectangle with corners 256,512 and 1024,1024 (tiles 9, 10, 11, 13, 14, and 15) and the 4 lowest resolution levels (out of 6, resulting in a ¼ scaling) are decoded. In the 192×128 decoded image, the crop rectangle now has corners (400−256)/4=36, (600−512)/4=22 and (900−256)/4=161 and (800−512)/4=72 and can be cropped with any method. A scaling of (⅙)/(¼)=⅔ can be performed with any method. Thus, the processing is performed for the 192×128 decoded image size and not the larger 1024×1024 full image size.

An Exemplary Layout Process

Figure 6:
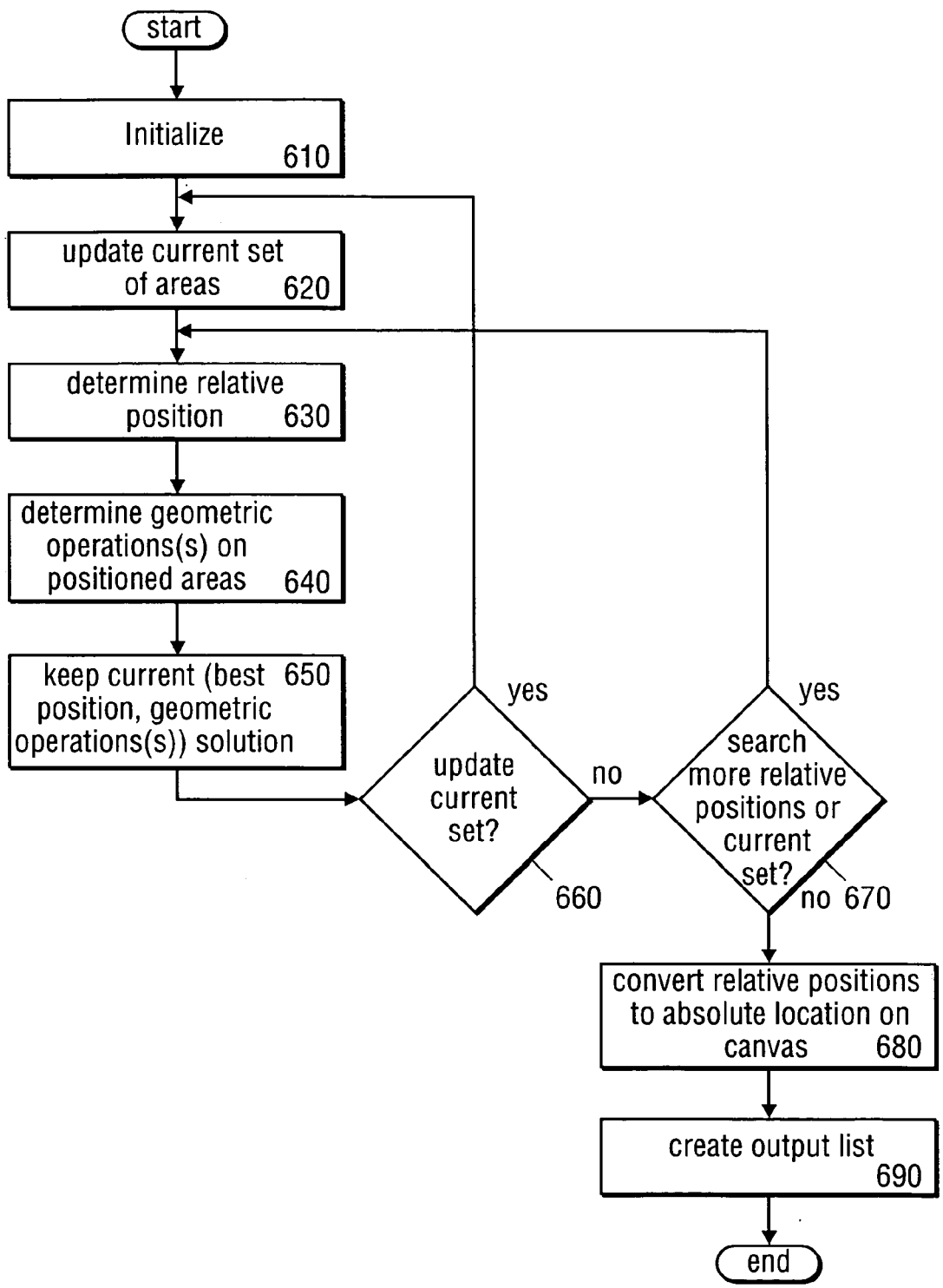
FIG. 6 is a flow diagram of one embodiment of a process for laying out an image.

FIG. 6 is a flow diagram of one embodiment of a process for laying out an image. The process, like others described below, is performed by processing logic that may comprise hardware (e.g., circuitry, dedicated logic, etc.), software (such as is run on a general purpose computer system or a dedicated machine), or a combination of both.

Referring to FIG. 6, processing logic first initializes the parameters, such as the current scale, current set of areas, counters, indices (processing block 610). Then processing logic updates the current set of areas (processing block 620). Processing logic determines the relative position of the one or more areas (processing block 630). Next, processing logic determines one or more of the geometric operations to be performed on positioned areas (processing block 640). Processing logic stores the current solution (best position, geometric operations) (processing block 650).

Afterwards, processing logic determines whether the current set of areas chosen for inclusion in the display is to be updated (processing block 660). If the current set is to be updated, then processing transitions to processing block 620 and processing blocks 620–650 are repeated. Otherwise, processing logic determines whether more relative positions for the current set are to be searched (processing block 670). If so, then processing transitions to processing block 630 and processing blocks 630–650 are repeated. Otherwise, processing logic converts the relative positions to absolute locations on the canvas (processing block 680). Finally, processing logic creates an output list (processing block 690).

An Exemplary Greedy Layout Process

In one embodiment, a greedy layout process may be used to compute pictorial document representations given the image and/or document analysis as input data.

The input list is given in the format described above. In one embodiment, the segments are produced by merging the output of text-based analysis with J2K-based wavelet analysis. This includes both text segments and image segments. The text segments have the text flag set to 1 and have at least one fragment with (frag #)=1. In one embodiment, the image segments are not subdivided into any fragments. In the example of the input list from Table 1, segments 0, 1, and 3 are image segments. Segment 2 is a text segment and contains three fragments with non-centered alignment. Note that in an alternative embodiment the image segments are subdivided. For example, a face in an image may be a segment divided from the others.

The text-based analysis determines the resolution attribute according to the minimal readable size. Therefore, additional scaling of text segments is not allowed ($s_{min}=1$), or is heavily penalized.

In contrast, the J2K-based wavelet analysis determines the resolution attribute according to the resolution containing the most information. Image segments could still be recognizable when being scaled to more than this resolution. Therefore, for image segments, the limiting scale $s_{min}$ can be set to, for example, the canvas-scale $s_c$. The threshold $\epsilon$ is set to zero. The canvas-scale may be defined as:

$$s_c = \min\left(\frac{c_{xdim}}{d_{xdim}}, \frac{c_{ydim}}{d_{ydim}}\right)$$

This process may be described in pseudo code as given below:

---

1. Given n segments with attributes I and s, order them with respect to largest importance value $S_0, \ldots S_{n-1}$
2. Set minimal scale $s_{min} > 0$
3. i = 0
   $s_{x,i} = s_{y,i} = s_i$
   while (i < n & $\lfloor Cost(A_i, s_i^*, B_i^*, p_i^*) = \infty \rfloor$)
   $i_0 = i - 1$
4. Set $\sigma(0) = i_0, k = 0$
5. for $i = i_0, \ldots n\{$
   $(s_i^*, B_i^*, p_i^*) = \arg \min_{s_i, B_i, p_i} Cost(A_i, s_i, B_i, p_i)$
   if($Cost(A_i, s_i^*, B_i^*, p_i^*) < \infty$ ){
   $\sigma(k) = i$
   k++
   }
   }
   K=k
6. Create output list of areas $\sigma(k), k = 0 \ldots, K - 1$ containing $(s_{\sigma(k)}^*, B_{\sigma(k)}^*, p_{\sigma(k)}^*)$

---

The "while" in step 3 loops finds the area with the highest importance such that the cost for positioning is finite. The sequence $\sigma(0)_1, \sigma(1)_1 \ldots$ stores the placed areas with finite cost. The "for" loop in step 5 checks all areas after the first area $A_{\sigma(0)}$ for parameters that meet constraints.

Figure 7A:
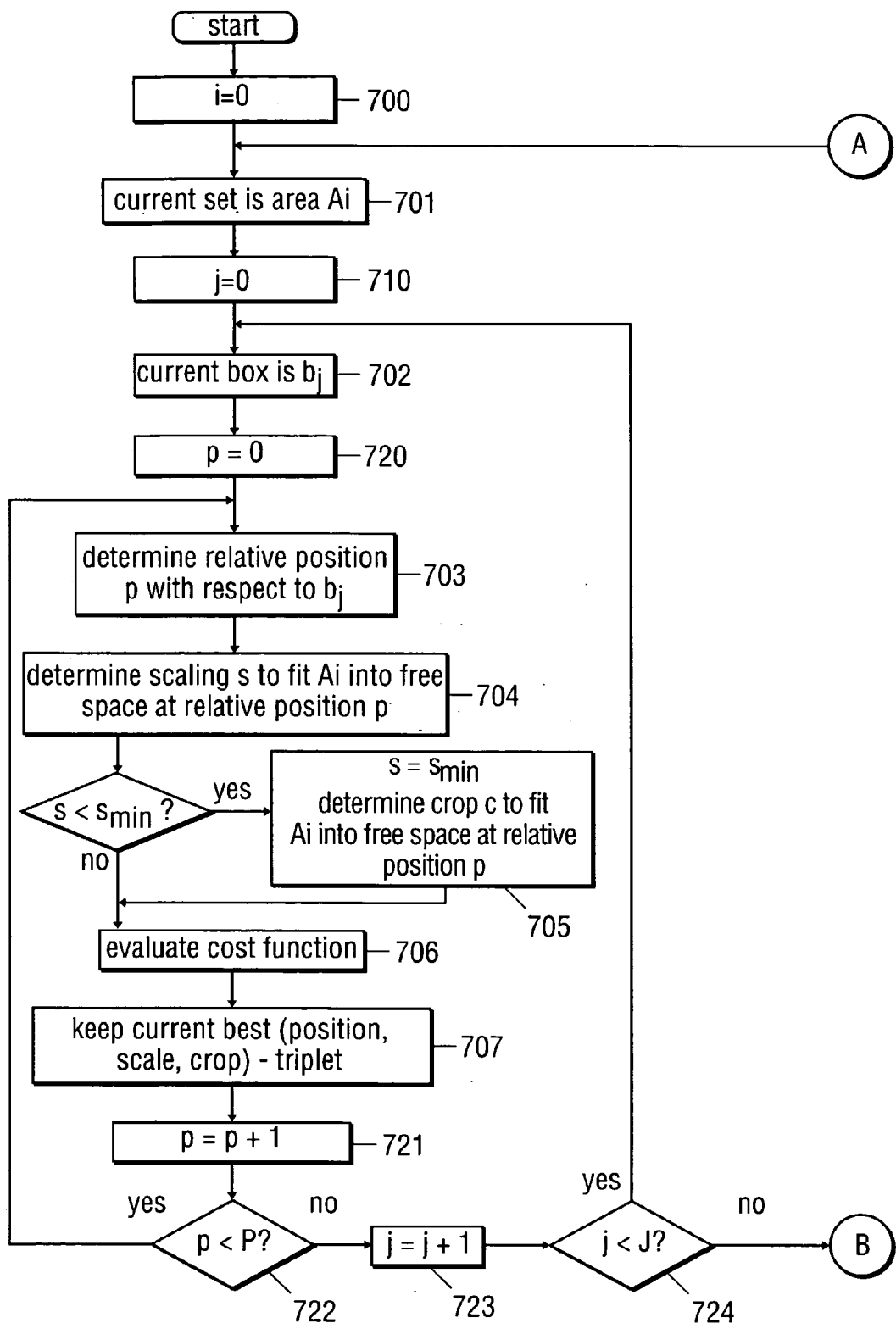
FIGS. 7A and 7B are a flow diagram of one embodiment of a process for reformatting an image using a greedy algorithm.
Figure 7B:
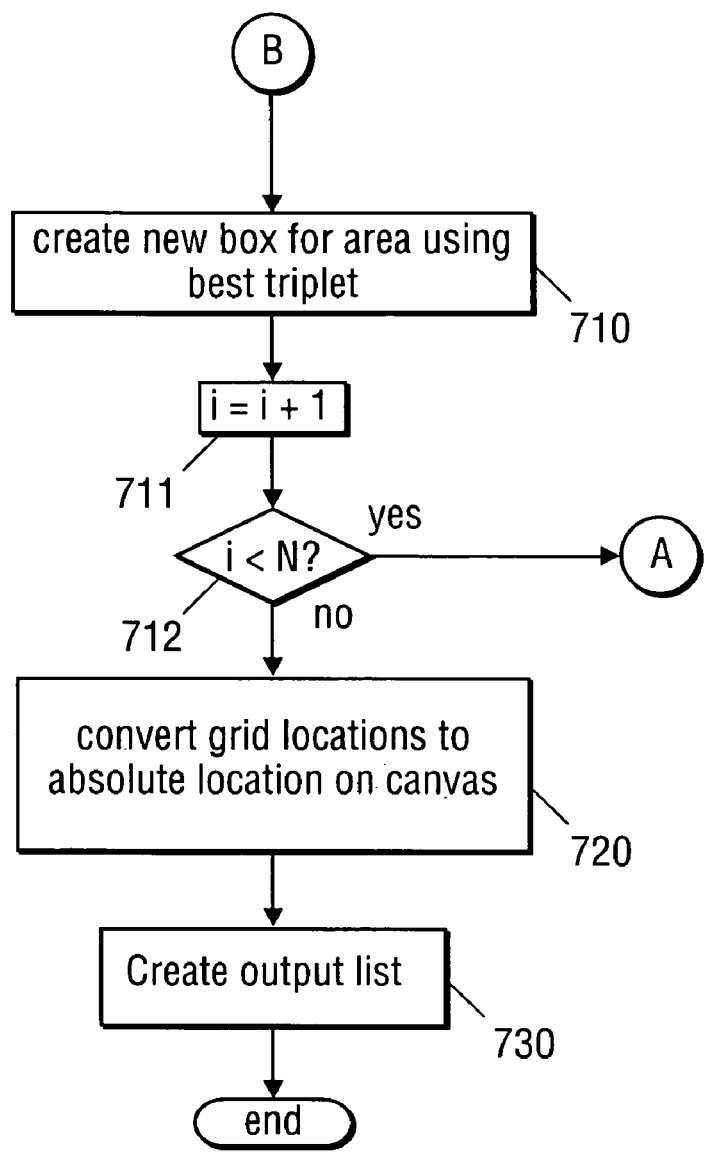

This pseudo code is illustrated in a flow diagram that illustrates one embodiment of a greedy layout process for reformatting images shown in FIGS. 7A and 7B. The process is performed by processing logic that may comprise hardware (e.g., circuitry, dedicated logic, etc.), software (such as is run on a general purpose computer system or a dedicated machine), or a combination of both.

Given n segments, processing logic orders the segments with respect to largest importance value, $S_0, \ldots, S_n$. The minimal scale $S_{min}$ is set to be greater than 0. Then each set of area is processed. Processing logic processes each area one by one.

In the following discussion, processing logic sets an area index variable i to zero (processing block 700) and the current set to area $A_i$ (processing block 701). Each area has a number of boxes, and each of the boxes is processed. Processing logic sets a current box index variable j to zero (processing block 710). Processing logic sets the current box to $b_j$ (processing block 702) and sets a position index variable p to zero (processing block 720).

Next, processing logic analyzes each relative position of box $b_j$, such as top, bottom, left, or right. More specifically, processing logic determines the relative position p with respect to box $b_j$ (processing block 703) and determines the scaling s to fit $A_i$ into free space at relative position p (processing block 704).

Processing logic then tests whether the scale s is less than the minimum scale $s_{min}$. If s is less than $s_{min}$, then processing logic sets s to $s_{min}$ and determines crop c to fit are $A_i$ into the free space at relative position p (processing block 705). Otherwise, s is left unchanged.

Afterwards, processing logic evaluates the cost function (processing block 706). The cost function may penalize scaling and cropping. Processing logic stores the current best triplet of position, scale, and crop (processing block 707).

Next, processing logic increments variable p by 1 (processing logic 721) and tests whether p is less than the total number of relative positions, P, for the area (processing block 722). In one embodiment, P=6 and "p=0" means in box left, "p=1" means in box right, "p=2" means in box above, "p=3" means in box below, "p=4" means in new box above and "p=5" means in new box below. If so, processing transitions to processing block 703. If not, the processing logic transitions to processing block 723 where the variable j is incremented by 1. Processing logic tests the variable j, which indicates the current box number, is less than the total number of boxes, J (processing block 724). If not, processing transitions to processing block 702. If so, processing transitions to processing block 710. Thus, the processing blocks 703–707 are repeated until all relative positions of box $b_j$ are processed and processing continues onto the next box, $b_{j+1}$ (processing block 708), repeating the process until all boxes are processed.

Referring to FIG. 7B, when all the boxes available for positioning of area $A_i$ are processed, processing logic creates a new box for $A_i$ using the best triplet (processing block 710). Then processing logic increments the variable i by 1 (processing block 711) and tests whether variable i is less than the total number of areas, N (processing block 712). If so, processing transitions to processing block 701 and processing blocks 701–711 are repeated on $A_{i+1}$. If not, indicating that all areas have been processed, processing logic converts boxes with relative locations to absolute locations on the canvas (processing block 720). Areas may be uniformly scaled to a maximal scale or to fill free space in corresponding boxes. Finally, processing logic creates an output list (processing block 730).

Boxes and Floating Areas

It may be desirable to keep some relations between segments in the final layout in the same way as they were in the original document. Preferences may exist to keep top/bottom and left/right relationships. In one embodiment these relationships are used for positioning in layout.

Figure 8:
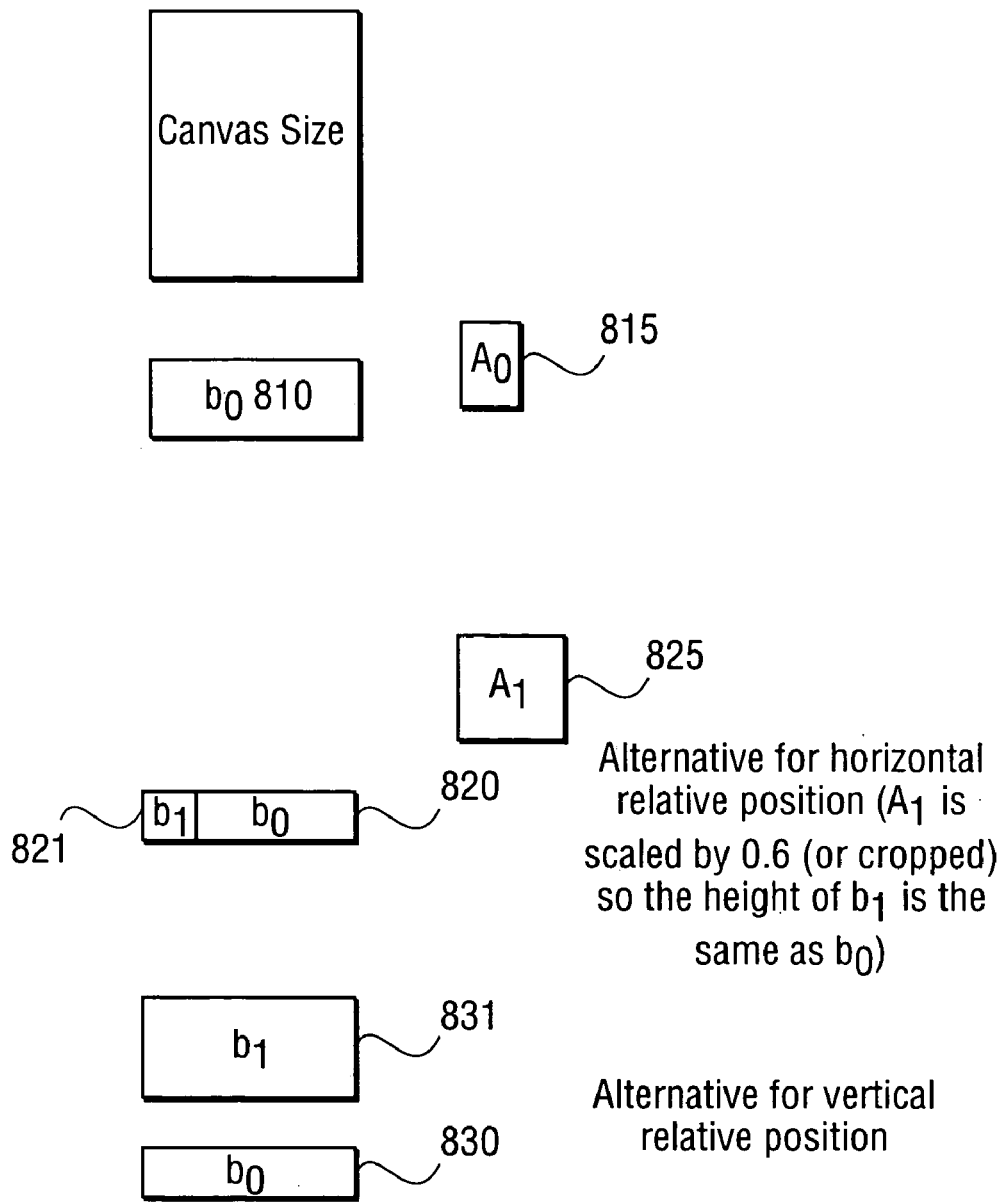
FIG. 8 shows examples of boxes.
Figure 9:
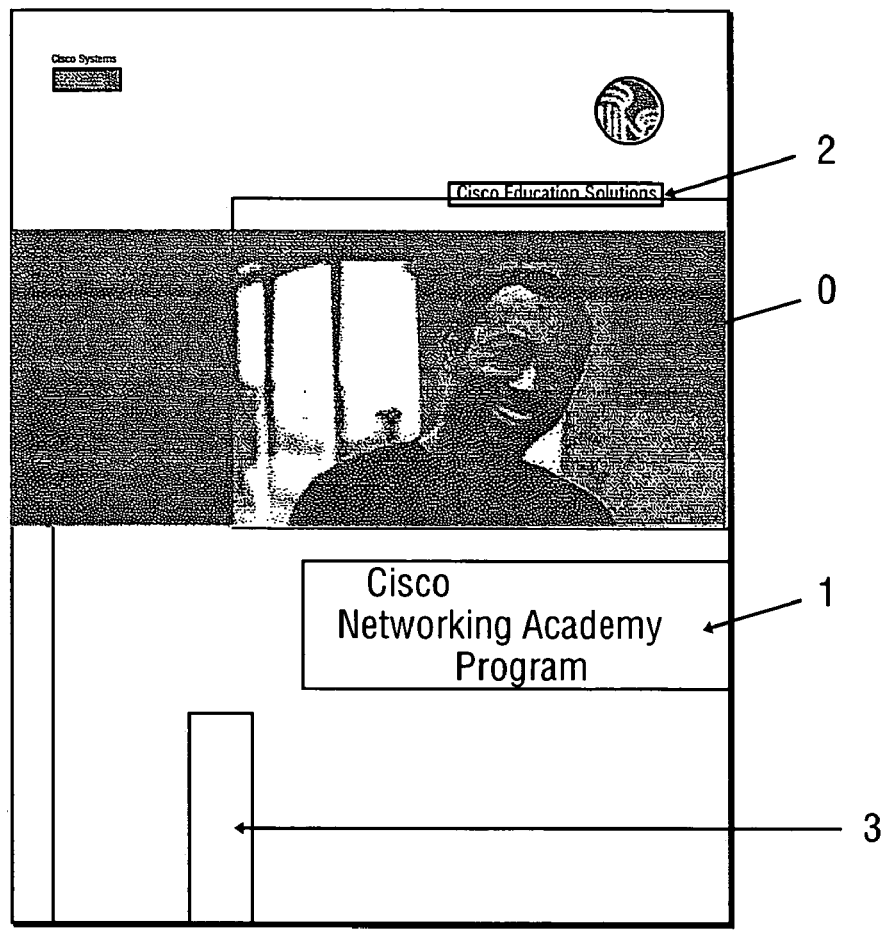
FIG. 9 shows an example of an input image and the output representation of the image.
Figure 9:
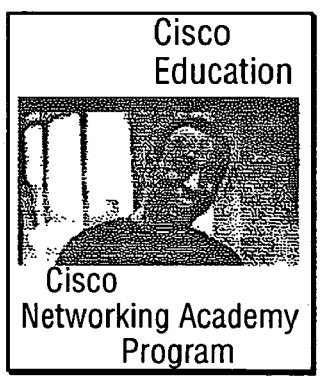
Figure 9:
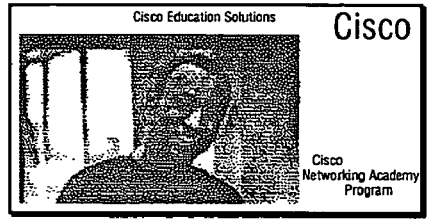
Figure 10:
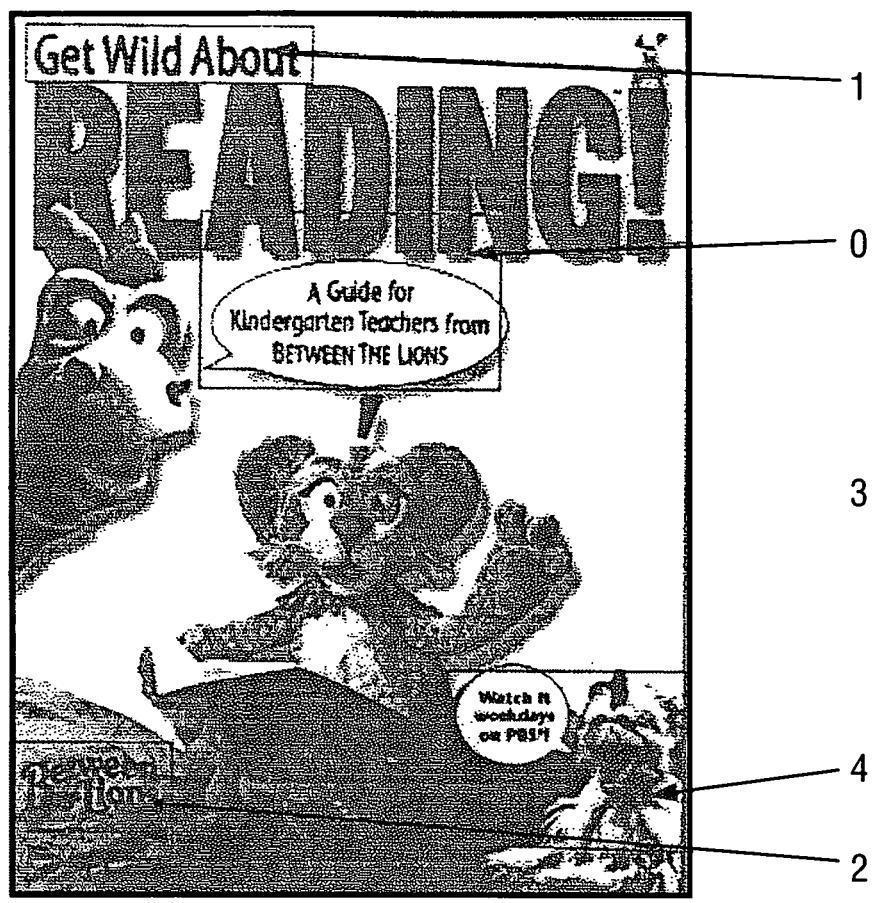
FIG. 10 shows an example of an input image and the output representation of the image.
Figure 10:
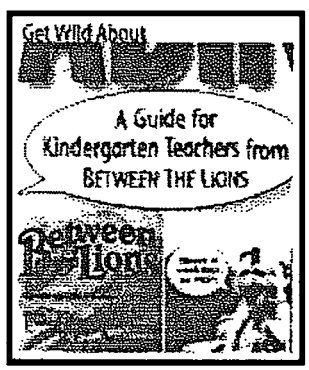
Figure 10:
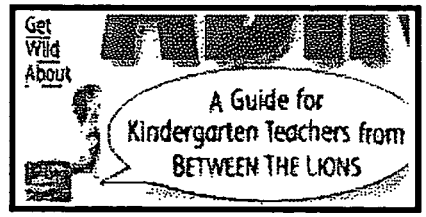
Figure 11:
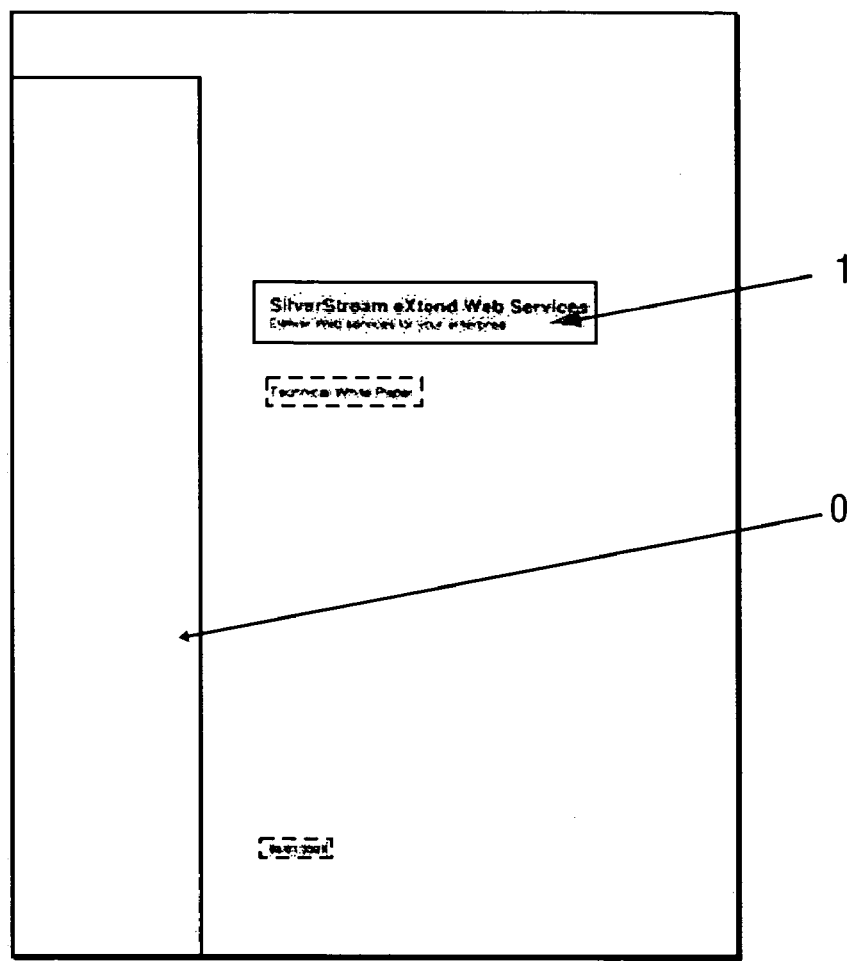
FIG. 11 shows an example of an input image and the output representation of the image.
Figure 11:
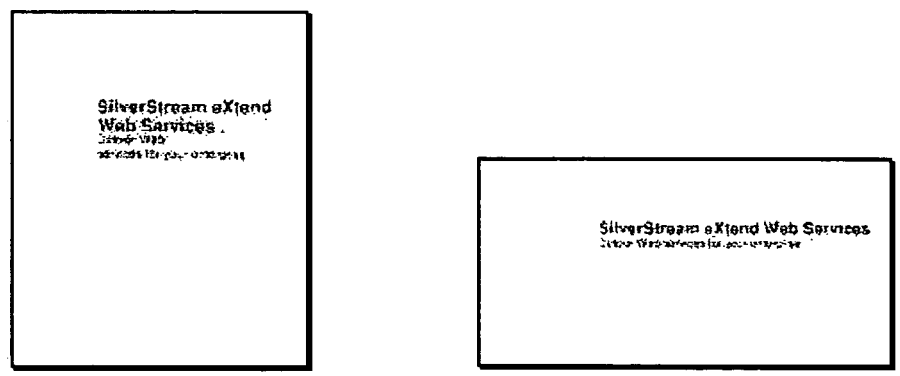
Figure 12:
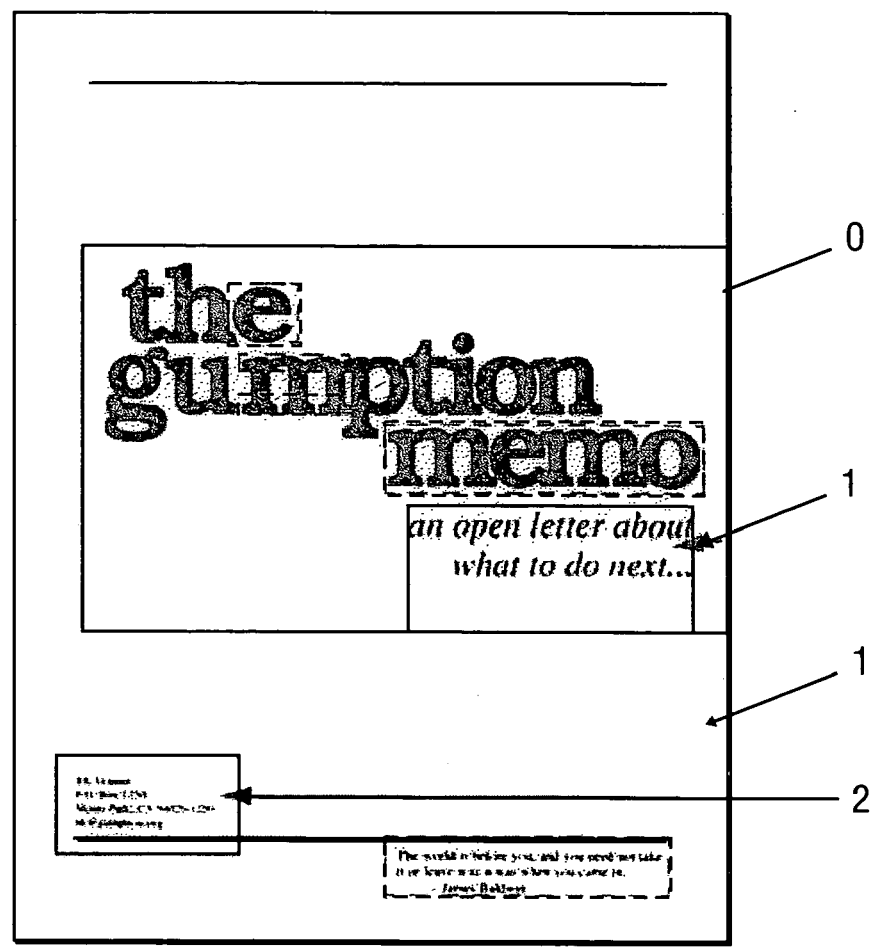
FIG. 12 shows an example of an input image and the output representation of the image.
Figure 12:
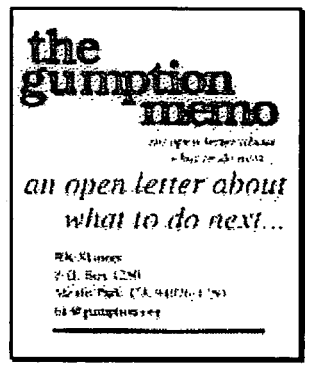
Figure 12:

In one embodiment, to preserve those relationships, some rectangular space are reserved for a positioned area. Then a determination is made as to whether another area may be placed above, below, left, or right. The initially reserved rectangle is referred to herein as a box. Examples of boxes are shown in FIG. 8. An area is placed inside the box, but no anchor point with respect to the box is set. Therefore, the segments are allowed to float in the box at this point.

Referring to FIG. 8, the width of the first box $b_0$ 810 for area $A_0$ 815 is set equal to the canvas width $C_{xdim}$, the height of the first box $b_0$ 810 is set equal to the height of the cropped and scaled area. The anchor point of $b_1$ 810 is set to (0,0). For the next area $A_1$ 825, first placing $A_1$ in the same row as $A_0$ is considered. $A_1$ is scaled so its height does not exceed the height of $b_0$. If the cost function produces a minimal result to the left (right) of the area $A_0$ in the box $b_0$, then a new box $b_1$ 821 is created for the area $A_1$ 825 with the width being equal to the width of cropped and scaled area $A_1$ 825 and the height being equal to the height of the parent box $b_0$ 810. Box $b_0$ 810 is reduced in size to box $b_0$ 820 by the amount of the newly created box $b_1$ 821. Another placement that is being considered is above or below the box $b_0$ 810. If such a placement results in the smallest penalty, the new box $b_1$ 831 is created with width equal to the canvas width and a height equal to the height of the cropped and scaled area $A_1$ 825. The anchor points of a box $b_i$, where i>0, are determined with respect to the anchor point of $b_0$ 810.

By including the priority of horizontal versus vertical placement, the use of boxes and floating areas supports the style of western reading order: left to right, top to bottom. For the Japanese reading order the priority of horizontal versus vertical placement could be reversed.

Relative Positioning of Areas with Respect to Available Free Space

In one embodiment, the positioning of a new box for a new area is done in the following way. If scale so is greater than the minimum scale, $s_{min}$, and the importance value is greater than 0, then the first box, $b_0$, is set at $b_0=[(0,0), (c_{xdim}, s_0 \cdot (c(A_0, B_0))_{ydim})]$.

Then for each box, $b_i$, at each direction, the scale, importance level, and the new penalty are computed. The direction at which the penalty is the least is identified, and the corresponding anchor, direction, and dimensions of scaled and cropped area are saved.

The following pseudo code describes the positioning of a new box for a new area.

```
i = 0
while(i < m & cost(A_i,S_i*,B_i*,p*)= ∞)i++
k = i
b_0 = [(0,0),(c_xdim,S_0 ·(c(A_0,B_0))_ydim)]
for(i = k + 1,...m){
    for j = 1,...,i−1 {
        for (direction = 0,...,5){
            penalty = 99999;
            compute s_i,B_i,p_i(...), new_penalty
            if(new_penalty < penalty) {
                best_anchor = new_anchor
                best_direction = direction
```

```
            best_dimensions = dimensions of scaled and cropped area
            parent_box = b_j
            penalty = new_penalty
          }
        }
      }
      if(penalty < 99999) {
          b_i = [best_anchor, best_dimensions]
          shrink parent box
      }
    }
  }
``` where $b_0$ is the canvas width and area height, and direction equals the coding for relative positions.

Fix Box and Area Locations with Respect to Global Canvas Positions, Alignment, etc.

As mentioned above, the anchor point of the boxes with respect to each other are set, but not with respect to the canvas. Furthermore, the exact placement of an area inside a box may need to be performed.

Figure 26A:
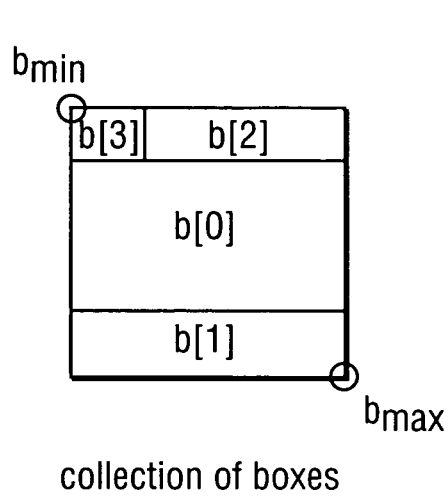
FIGS. 26A, 26B, and 26C illustrate a collection of boxes, a canvas, and a collection of boxes after adjusting the anchor point with respect to the canvas, respectively.
Figure 26B:
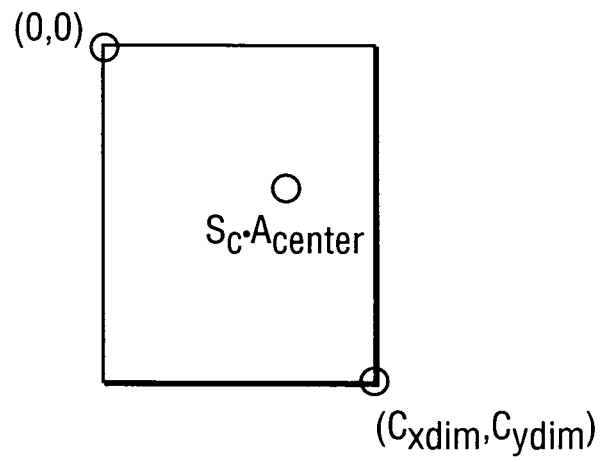
Figure 26C:
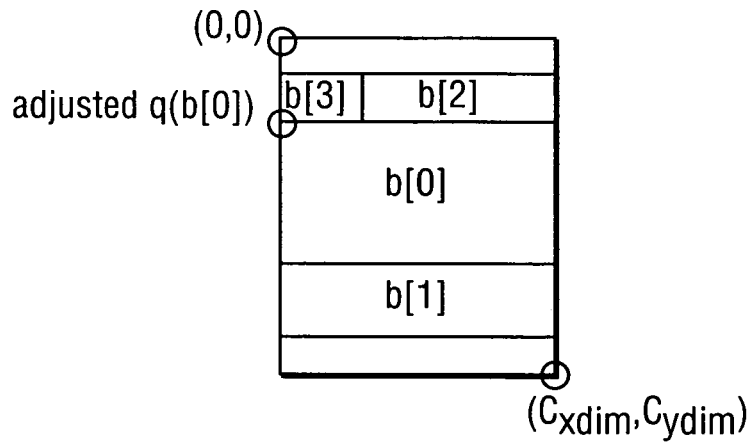

The anchor point of box $b_0$ is set with respect to the canvas in such a way that the center point of the box is located as close to the center point of the area with respect to the original document—scaled to canvas size with $s_c$—as the canvas dimensions allow it. FIGS. 26A–26C provides an example of the placement of boxes and adjusting the anchor point. The box first placed in the layout algorithm is denoted with b[0]. It contains an area A with anchor point q(A) and dimensions ($A_{xdim}$, $A_{ydim}$). The boxes b[i] (i=0, ... N−1) have anchor points q(b[i]) and dimensions (b[i]$_{xdim}$, b[i]$_{ydim}$). The anchor point is located at the upper left corner of an area.

$$A_{center} = q(A_0) + \frac{1}{2} \cdot (A_{x\ dim}, A_{y\ dim}),$$

$$b[0]_{center} = q(b[0]) + \frac{1}{2} \cdot (b[0]_{x\ dim}, b[0]_{y\ dim}),$$

$$b_{max} = \max_{i=0,\ldots N-1}(q(b[i]) + (b[i]_{x\ dim}, b[i]_{y\ dim}))$$

$$b_{min} = \min_{i=0,\ldots N-1}(q(b[i]))$$

The adjusted anchor point $q(b[0])_{new}$ for the box b[0] is described as follows:

$$q(b[0])_{new} = q(b[0]) - b_{min} + b_{min,\ new}$$

with $$b_{min,new} = \min(\max((0,0), s_c \cdot A_{center} - \frac{1}{2} \cdot (b[0]_{xdim}, b[0]_{ydim}) - (q(b[0]) - b_{min})),$$

$$(c_{x\ dim}, c_{y\ dim}) - (b_{max} - b_{min})),$$

where ($c_{xdim}$, $c_{ydim}$) are the canvas dimensions.

The anchor points of the remaining boxes are adjusted as follows:

$$q(b[i])_{new} = q(b[i]) + [q(b[0]) - q(b[0])_{new}] \text{ for } i=1, \ldots, N-1.$$

The area inside the box b[0] is placed such that the center point of the box is located as close to the center point of the area with respect to the original document, scaled to canvas size with $s_c$ as the box dimensions allow it. The anchor points of the remaining boxes are translated following the adjustment of q(b[0]) keeping accordingly their relative positioning to b[0]. Then the positioning method that was performed for the area inside of the box b[0] and its area is repeated for each of the remaining boxes and areas. Finally, the fragments inside a placed area are positioned under consideration of the alignment type.

The operation of using boxes, keeping the areas inside the boxes floating, and having the positioning of areas fixed after all boxes are created are performed in order to overcome the disadvantages of a purely greedy algorithm to some extent.

In contrast to the "level" algorithm, geometric manipulations, such as scaling and cropping, may be used to fit areas into available spaces and the relative position of areas is considered.

Output List

The output list is created to be used in combination with a J2K decoder. In one embodiment, parameters in the output list include resolution level to be extracted by the J2K decoder, crop locations and dimensions in the low-resolution image, additional scaling of the cropped image, and paste location onto the canvas (locations of the areas inside the boxes).

EXAMPLES

Layouts for some of the examples are shown in FIGS. 9–12. Merging the document analysis with the J2K-based wavelet analysis creates the input lists. Then the layouts are computed for two different displays (130×160, 200×100) with the greedy layout process described above and shown in Tables 4–7. The resolution columns ("res" in Tables 4–7) show the resolution extracted with the J2K decoder. The scaling columns shows the final scaling>0.5. A scaling value of 1 indicates text that is not allowed to be scaled any further. The segment numbers refer to the numbers in the segmentation images (top in FIGS. 9–12) that describe the ranking of the segments in the input list. Segments 0, 1, and 3 in FIG. 9, segments 1, 3–5 in FIG. 10, segment 0 in FIG. 11, and segments 0 and 2 in FIG. 12 come from the J2K-based wavelet analysis. Segment 2 in FIG. 9, segment 2 in FIG. 10, segment 1 in FIG. 11, and segment 1 in FIG. 12 come from the text-based analysis. The final images produced by the pictorial representations are also displayed in FIGS. 9–12.

TABLE 4

Layout composition list for cnap_brochure.

| canvas size | seg | res | xloc1 | yloc1 | xdim | ydim | scaling | xloc2 | yloc2 |
|---|---|---|---|---|---|---|---|---|---|
| 130 × 160 | 0 | 3 | 96 | 80 | 216 | 152 | 0.601852 | 0 | 24 |
|  | 1 | 3 | 144 | 256 | 144 | 48 | 0.902778 | 0 | 115 |
|  | 2 | 2 | 394 | 154 | 38 | 12 | 1.000000 | 62 | 0 |
|  | 2 | 2 | 439 | 154 | 68 | 12 | 1.000000 | 62 | 12 |
| 200 × 100 | 0 | 3 | 96 | 80 | 216 | 152 | 0.657895 | 0 | 0 |
|  | 1 | 4 | 72 | 128 | 72 | 24 | 0.805556 | 142 | 72 |
|  | 2 | 2 | 394 | 154 | 38 | 12 | 1.000000 | 162 | 0 |
|  | 3 | 3 | 80 | 304 | 32 | 108 | 0.625000 | 142 | 2 |

TABLE 5

Layout composition lists for BTL_KGuide.

| canvas size | seg | res | xloc1 | yloc1 | xdim | ydim | scaling | xloc2 | yloc2 |
|---|---|---|---|---|---|---|---|---|---|
| 130 × 160 | 0 | 2 | 192 | 192 | 256 | 160 | 0.507812 | 0 | 10 |
| | 1 | 4 | 97 | 9 | 60 | 10 | 1.000000 | 1 | 70 |
| | 2 | 2 | 32 | 672 | 128 | 128 | 0.539062 | 0 | 91 |
| | 3 | 3 | 208 | 304 | 104 | 88 | 0.586538 | 70 | 109 |
| 200 × 100 | 0 | 2 | 192 | 192 | 256 | 160 | 0.625000 | 40 | 0 |
| | 1 | 4 | 9 | 9 | 15 | 13 | 1.000000 | 0 | 0 |
| | 1 | 4 | 24 | 9 | 19 | 13 | 1.000000 | 0 | 13 |
| | 1 | 4 | 44 | 9 | 25 | 13 | 1.000000 | 0 | 26 |
| | 2 | 4 | 8 | 168 | 32 | 32 | 0.781250 | 0 | 75 |
| | 3 | 4 | 56 | 96 | 16 | 56 | 0.937500 | 25 | 34 |

TABLE 6

Layout composition list for Silverstream Webservices.

| canvas size | seg | res | xloc1 | yloc1 | xdim | ydim | scaling | xloc2 | yloc2 |
|---|---|---|---|---|---|---|---|---|---|
| 130 × 160 | 0 | 4 | 8 | 16 | 32 | 168 | 0.952381 | 4 | 0 |
| | 1 | 3 | 113 | 120 | 81 | 19 | 1.000000 | 38 | 30 |
| | 1 | 3 | 196 | 120 | 55 | 9 | 1.000000 | 38 | 39 |
| | 1 | 3 | 113 | 129 | 32 | 7 | 1.000000 | 38 | 46 |
| | 1 | 3 | 146 | 129 | 69 | 7 | 1.000000 | 38 | 53 |
| 200 × 100 | 0 | 4 | 8 | 16 | 32 | 168 | 0.595238 | 20 | 0 |
| | 1 | 3 | 112 | 120 | 140 | 16 | 1.000000 | 60 | 23 |

TABLE 7

Layout composition list for gumption_memo.

| canvas size | seg | res | xloc1 | yloc1 | xdim | ydim | scaling | xloc2 | yloc2 |
|---|---|---|---|---|---|---|---|---|---|
| 130 × 160 | 1 | 4 | 16 | 40 | 136 | 80 | 0.955882 | 0 | 0 |
| | 1 | 3 | 163 | 202 | 129 | 30 | 1.000000 | 1 | 76 |
| | 2 | 2 | 32 | 656 | 176 | 80 | 0.675000 | 0 | 106 |
| 200 × 100 | 0 | 3 | 32 | 80 | 272 | 160 | 0.625000 | 30 | 0 |
| | 2 | 4 | 8 | 164 | 44 | 20 | 0.681818 | 0 | 77 |

Extensions

The greedy layout process discussed above first sorts the segments with respect to their importance value and then selects the one with the highest value for the first placement operation. Given a set of segments with similar importance values, this operation may result in only placing one segment instead of placing several and reducing the scaling factors. In one embodiment, to overcome this problem, a set of segments with similar importance values are considered for the first placement operation. In another embodiment, the problem is overcome by changing relative positioning between areas to remove free space, scaling the free space removed to fit the canvas size, and removing an area from the original set and starting with changing relative positioning again if resulting scale factors for the area is smaller than the minimal scale factor of the area.

Some clustering algorithm applied to the importance values could determine which area belongs to the initial set. Depending on the application, the conditions on minimal scaling, the threshold ϵ and weights in the cost function are chosen depending on the application.

In one embodiment, context-based layout is included. In this embodiment, the importance of a segment is influenced by a parameter that is determined from user-pattern or behavior. For example, a segment could be given higher importance if its content is the result of a key word search. Another example could introduce some learning step on how people would like to see their documents recomposited.

An Exemplary Non-Greedy Layout Process

In one embodiment, the layout process of the present invention is a non-greedy layout process. A number of non-greedy layout processes are possible. In one embodiment of a non-greedy layout process, each area has a minimum scale, a current scale and a Maximum Scale Under Geometric Constraints (MSUGC). One option for the minimum scale for an area is the scale that would make the area the same size as in a traditional thumbnail. The minimum scale can be expressed as:

$$\text{minimum\_scale} = \frac{\min\left(\frac{\text{canvas\_width}}{\text{page\_width}}, \frac{\text{canvas\_height}}{\text{page\_height}}\right)}{\text{unnormalized\_preferred\_scale}}$$

Another option for minimum scale is the scale that would make the area twice as large as a traditional thumbnail. This option might be used in an application when both a traditional thumbnail and a smaller representation generated from wavelet analysis were used since it would force the smaller representation to be different than traditional thumbnails. The minimum scale can be expressed as:

$$\text{minimum\_scale} = 2\frac{\min\left(\frac{\text{canvas\_width}}{\text{page\_width}}, \frac{\text{canvas\_height}}{\text{page\_height}}\right)}{\text{unnormalized\_preferred\_scale}}$$

In one embodiment, the scale parameter is normalized so that the largest possible MSUGC is 1.0. For some areas, the MSUGC can be less that 1.0. The MSUGC is limited so that the canvas boundaries are not exceeded and the area does not overlap any other areas, assuming the other areas are at the current scale. For example, if an area has width 214 and X position 50, to not exceed the canvas boundary at X=0, the MSUGC must be 50/(214/2)=0.467 or less. Similarly, if an area has height 13 and Y position 121 and there is another area with height 20 after applying this area's current scale and Y position 135, the MSUGC is ((135−121)−20/2)/(13/2)=0.615 or less. ((135−121)−20/2)/(13/2)=0.615.

The current scale is a value between the minimum scale and the MSUGC. It is the scale for an area at a particular stage in the non-greedy layout. If the current scale is less than the MSUGC for an area, the area has free space around it and the non-greedy layout may expand this area by increasing its current scale. Free space may be measured as the minimum distance between a boundary at its current scale area and any canvas boundary or any other area at that rectangles current scale.

Note that these scales can be used for embodiments of the greedy layout process described above.

As discussed above, a greedy layout process may be implemented using a cost function, but non-greedy layout process uses the slope of the cost function and the inverse of the function. Details of cost function are described above.

Figure 13:
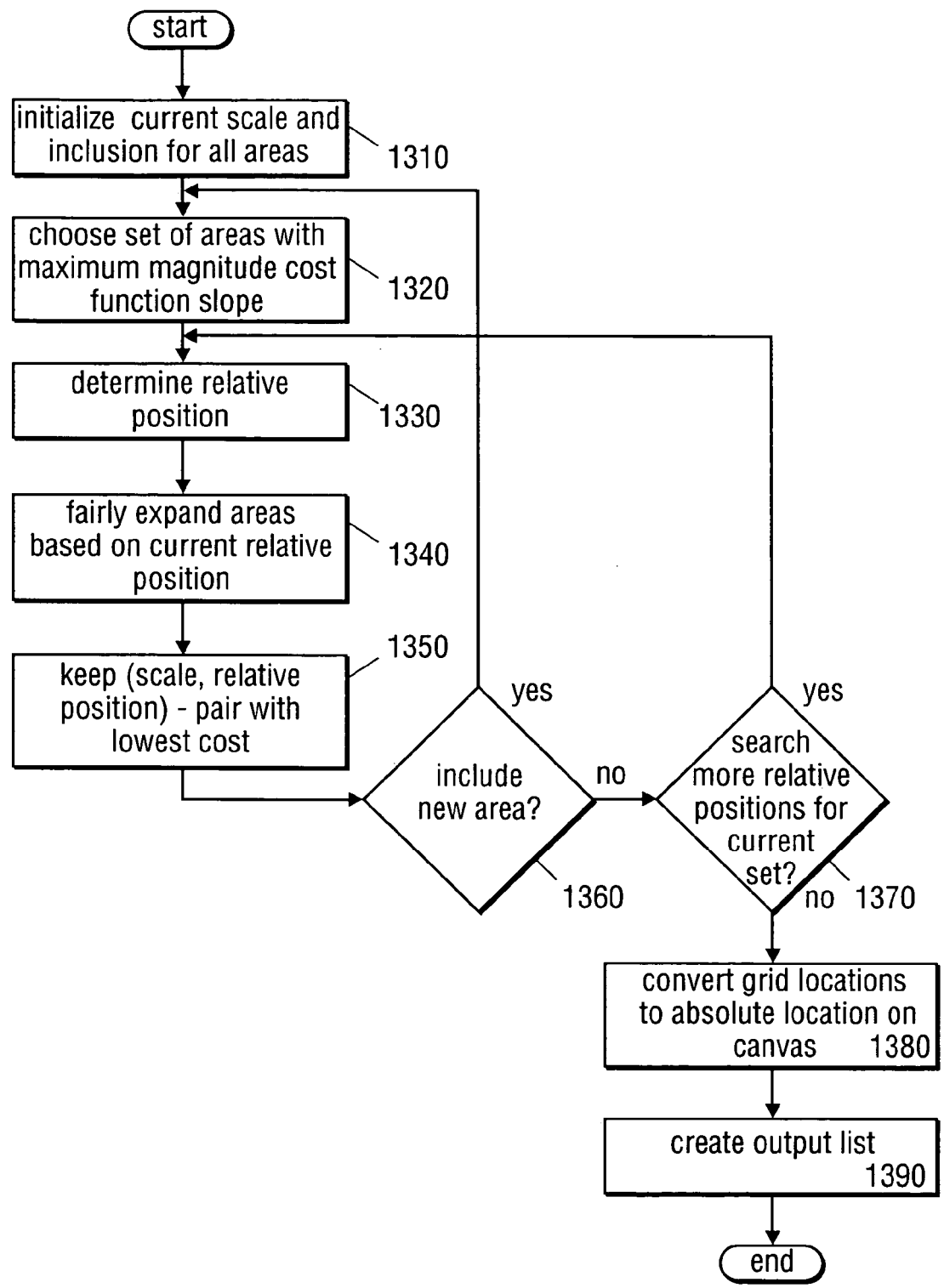
FIG. 13 is a flow diagram of one embodiment of a process for reformatting image segments using a non-greedy algorithm.

Referring to FIG. 13, an embodiment of reformatting image segments using the non-greedy algorithm is shown. The components in the system are implemented with processing logic that may comprise hardware (e.g., circuitry, dedicated logic, etc.), software (such as is run on a general purpose computer system or a dedicated machine), or a combination of both. Initially, processing logic sets the scale for all areas to the minimum allowable scale (processing block 1310). If the process is allowed to not include all areas, inclusion for all areas is set to "not currently included". Alternatively, inclusion for all areas is set to "currently included" if the process includes all areas. One embodiment may sort the areas by the slope (derivative) of their cost function (see Equation (4) above) initially to simplify choosing a set of area (see below). In one embodiment, cropping is ignored, so cropping is set to "none."

To choose a set of areas, processing logic computes the slope (derivative) of the cost function (see Equation (4) above) for each area and identifies the set of areas with the largest magnitude (most negative) slope (processing logic 1320). In one embodiment, the process uses a threshold close to the largest magnitude to avoid comparing floating point numbers for equality. For example, any areas with slope magnitude greater than 99% of the maximum magnitude slope can be in the set.

If an area is already at its MSUGC, then either it is at the preferred resolution, or at least one of its edges is at a canvas boundary, or at least of its edges is at the edge of another area. Areas already at a MSUGC may be considered or ignored when determining this set. If they are considered, changing position is performed to increase the scale. If they are not considered, then other areas may increase their scale even if their contribution to reducing cost is not as much as the contribution if the areas at MSUGC where considered.

Processing logic determines the inclusion of the set of areas. If any area in the largest slope magnitude set has not yet been included, it is included. (They are tentatively included. They will be removed if there is no feasible solution found with them included. If there are multiple areas that have not yet been included, any subset of these which is a feasible solution maybe included.)

Next, processing logic determines the position of the set of areas (processing block 1330). A search for new positions that are feasible is performed. If one or more new areas have been included or if this is the first time a position has been searched for, any feasible positions are accepted. Otherwise, in one embodiment, there is a past feasible solution and a new feasible solution must also have free space greater than a threshold THRESH_FREE (e.g., free space greater than 1.0). The detail of searching positions is described below. If possible, positions are found with extra space around all areas in the set. In an alternate embodiment, absolute locations are used, and therefore, it is unnecessary to search for relative position.

Finally, processing logic fairly expands the areas in the set (processing logic 1340). If all areas in the set have free space around them, increasing the scale can expand them. In one embodiment, this is done fairly such that all areas have the same cost function slope after the change in scale. The slope for the maximum scale for each area in the set is determined with Equation (4) described above. Also the slope for the largest magnitude of all areas not in the set is determined. The maximum magnitude value of these slopes is first tried for expansion. Equation (5) above may be used to find the scale for each area that corresponds to this slope. If these values for scale do not cause any areas to overlap, these values are accepted.

If these scale values are too large to prevent overlap, slope values between the previous value before this and the value that resulted in overlap can be tried. The search can end when a value for the slope which results in no overlap but less than a threshold (e.g., 1.0) of extra space. One embodiment uses a binary search. Other embodiments may adopt different search techniques.

Processing logic stops evaluating additional image segments when no improvement is found by including more areas (processing block 1360) or by searching more positions (processing block 1370). In this embodiment, it is a user option to terminate at a "fair solution" where the loop terminates when an area in the maximum slope set reaches the maximum scale or if after reaching a "fair solution" the areas at maximum scale areas ignored and other areas are allowed to continue to expand.

After the main loop terminates, grid positions are converted to absolute locations on the canvas (processing block 1380), as described in more detail below. In some cases when relative location or no location is used, the layout will be constrained to the canvas in one dimension but not in another. For example, the layouts shown in FIGS. 3c and 3d are only constrained horizontally. A less likely case is that the layout will not be constrained in either dimension. Extra space in an unconstrained dimension can be allocated fairly, according to absolute location, or in some other way. FIG. 3c shows allocation of extra space in the vertical dimension using absolute location, which causes all the areas to be grouped in the upper part of the canvas. Finally, the absolute locations and current scales are used to create an output list (processing block 1390).

One embodiment of the non-greedy layout process has the goal of searching efficiently because an exhaustive search would be intractable for more than a few areas.

Searching for Positions

In one embodiment, in order to search for positions, processing logic tries 1D arrangements where all areas are arranged horizontally or vertically to search for positions (processing block 1330). If relative location constraints are used, only feasible 1D arrangements are considered. The 1D arrangements can be checked with less effort than checking the 2D arrangements as described below and the 2D search can ignore arrangements with only one row or column. Alternatively, the 2D search can consider arrangements with only one row or column.

Figure 14B:
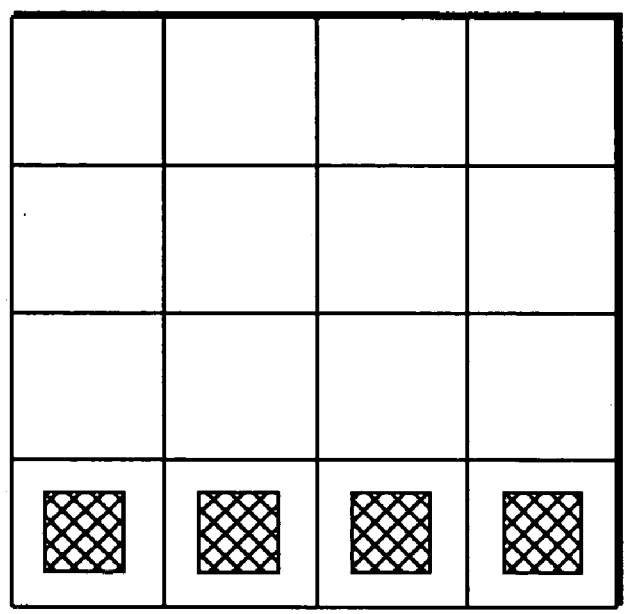
FIGS. 14A and 14B show examples of arrangements of four areas on a 4×4 grid.
Figure 14A:
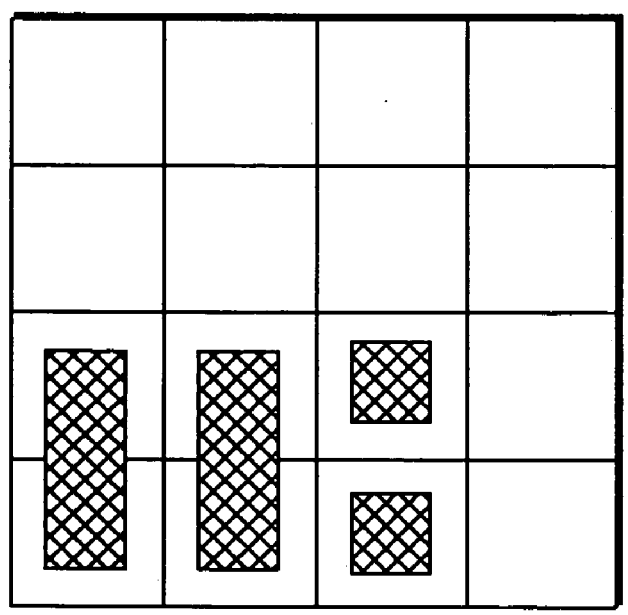
Figure 15:
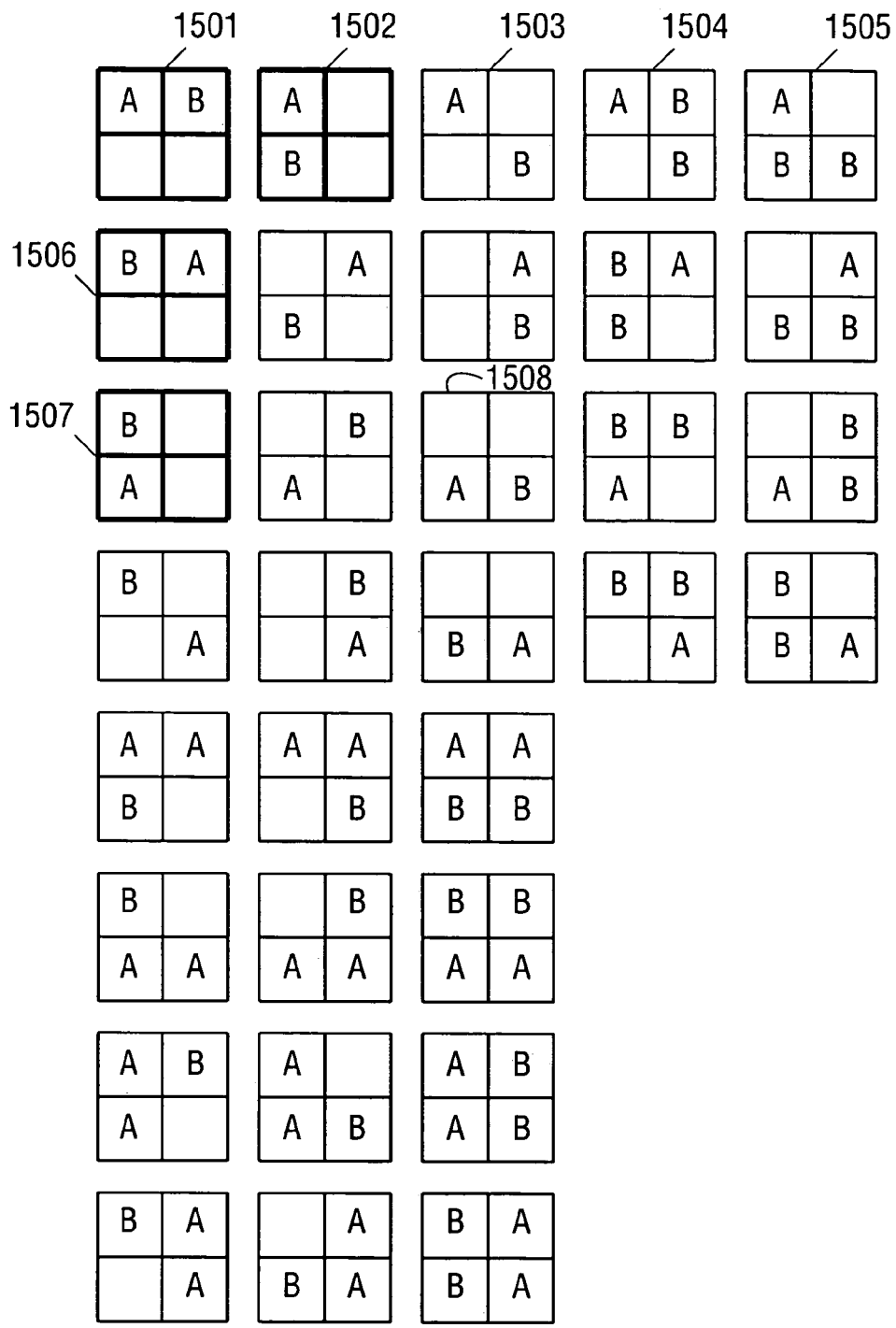
FIG. 15 shows examples of arrangements of two areas, A and B.

One embodiment of a 2D search for positions is as follows. For N areas, each area is assigned a location in an N×N grid. The grid represents relative locations. Comparing the horizontal grid coordinate for two areas indicates that they may overlap horizontally if equal or must be separated horizontally (i.e., left—right or east—west). An area may be placed in multiple grid locations. When the area is placed in multiple grid locations, the area straddles multiple grid locations. This allows, for example, one area to horizontally overlap two other areas and does not restrict the search to guillotine cuts. Boxes as described previously and a grid are representations for relative positions of areas. Boxes may be described in terms of a grid. An assignment of areas to a grid that is "1.5. dimensional" may be described in terms of boxes. FIG. 14 shows some examples of arrangements. The grid assignment in FIG. 14A corresponds to the position of areas in FIG. 3C. The grid assignment in FIG. 14B corresponds to the position of areas in FIG. 3D. FIG. 15 shows all possible arrangements of two areas. Grid assignments 1501, 1502, and 1403 assign areas A and B each to a single grid location. Grid assignments 1504 and 1505 assign area B so it straddles two grid locations. Grid assignments 1501 and 1508 both assign area A to the left of area B. These assignments are equivalent. There are many equivalent assignments. Eliminating equivalent assignments results in a canonical set of assignments. One possible canonical set of assignments is the ones shown in bold (1501, 1502, 1506, 1507).

A branch-and-bound search is performed over possible grid locations and straddles for each area. Each area is placed on the grid until a predetermined number of areas are placed or all areas are placed, and then the positions are checked to determine if the positions are feasible. This process is repeated until a set of feasible positions is found. This process is represented in the following pseudo code.

```
while no feasible positions do
    for each area do
        place area on grid
        if more than THRESH_CHECK areas placed
            check if positions are feasible
        else if all areas placed
            check if positions are feasible
```

For example, suppose THRESH_CHECK is 3 and there are 5 areas. In this case, when 4 areas are placed, a check for feasibility is performed and if this fails, then the position of one of the previously placed 4 areas is re-positioned instead of placing the 5th area.

Furthermore, in one embodiment, the search space is limited by certain constraints. In one embodiment, one or more of the constraints is that two areas cannot occupy the same place, the widths of all areas assigned to any row may not exceed the canvas width, and the height of all areas assigned to any column may not exceed the canvas height.

Also the search space is limited by the following constraints that eliminate redundant positions. These define canonical forms for positions. Canonical positions for two areas are shown with thick lines in FIG. 15 (1501, 1502, 1506, 1507). The first of these constraints is that rows having no areas assigned to them (empty rows) are only allowed to be below (south of) rows with areas. When N areas are unplaced, there can be at most N empty rows above (north of) non-empty rows. In FIG. 14, the example corresponding to FIG. 3c has one empty row at the bottom (south).

The second of these constraints is that columns having no areas assigned to them (empty columns) are only allowed to be on the right (east) of columns with areas. When N areas are unplaced, there can be at most N empty columns on the left (west) of non-empty columns. In FIG. 14, both examples have multiple empty columns at the right (east).

In one embodiment, each grid location is considered in raster order when an area is placed on the grid. The first time a row in the grid is considered after at least one previous area has been placed, a check for exceeding the canvas width or too many empty rows above (north of) non-empty rows are performed. If these row checks pass, then positions in the row can be considered. For each position not occupied by another area, a check for exceeding the canvas height or too many empty columns left (west of) non-empty columns are performed.

In one embodiment, checking if positions are feasible begins with computing the amount of free space. The "free width" without straddling, which is the sum of the maximum width for every column, is computed. The "free height" without straddling, which is the sum of the maximum height for every row, is computed.

Optionally, the following cases for straddling can be considered: 1) no straddling; 2) straddle for width only; 3) straddle for height only; and 4) straddle for both width and height.

Alternatively, only cases (2)–(4) or only case (4) alone can be considered. If the free width and free height are both greater than THRESH_FREE, case 1 meets canvas size constraints. Otherwise, straddling, as discussed below, may meet canvas size constraints. If a solution meets the canvas size constraints and if relative position constraints are used, these position constraints are checked. If these checks pass, the positions are feasible. If no feasible solution was found, the check fails. Otherwise, the relative positions can be converted to actual absolute locations.

To convert relative positions to actual absolute positions (processing block 1380), first the minimum width for each column and height for each row are computed. If a particular row or column is not affected by straddling, the width or height is the maximum width or height for any area in the row or column (respectively). For the case with straddling, consider determining width of columns. Columns are processed sequentially from left to right (or right to left; west to east or east to west). The maximum width of all areas in the column that do not straddle into a column to be processed later is determined. This maximum is used for the width of the column and is subtracted from the width of any areas that straddle (are in both) this current column and any column to be processed later. The next column in order (perhaps containing areas adjusted width due to straddling) is considered. A similar procedure is used for the height of columns. Once the minimum widths and heights are determined for all columns and rows, the difference between the sum of the minimum widths and the canvas width and the sum of the minimum heights and the canvas height is divided among the columns and rows (respectively). This division of extra space may be uniform or only rows and columns that have an area that is not at its maximum scale or may be proportional the increase in size to the increase in importance of the area. Once the width of columns and height of rows are found, the center coordinates can be used for areas in dimensions that do not straddle and the width of groups of columns and/or heights of groups of rows can be used to find centers for areas in dimensions that straddle.

FIG. 16 shows an example of grid assignments for four areas and the height and width of each area at the current scale. The top row has a maximum height of 30 and the bottom row has a maximum height of 40. In one embodiment, the canvas has a height of 160. Therefore, the free vertical space is 160−30−40=90. In this example, the free vertical space is distributed equally to both rows so the heights are 30+90/2=75 and 40+90/2=85 respectively. The center Y position of areas A and B are 75/2=37.5 and the center Y position of areas C and D are 75+85/2=117.5. An exemplary non-greedy layout uses non-integer positions, but the final output is rounded to an integer. Similarly for the horizontal dimension, assume that the canvas has a width of 130. The free horizontal space is 130−70−60=0. With no free space to allocate, the widths of the columns are the same as the maximum width of the areas in each column, i.e., 70 and 60 respectively. The center X position for areas A and C is 70/2=35 and the center X position for areas B and D is 70+60/2=100.

To avoid searching redundant solutions (in processing block 1330), straddling only to the right (east) or down (south) is considered. If only horizontal straddling is considered, a straddle right (east) for each area until the edge of the grid, an empty column or another area in the same row is found can be checked. Similarly, if only vertical straddling is considered, a straddle down (south) for each area until the edge of the grid, an empty row or another area in the same row is found can be checked. Otherwise, many two-dimensional straddles may need to be checked.

Figure 17:
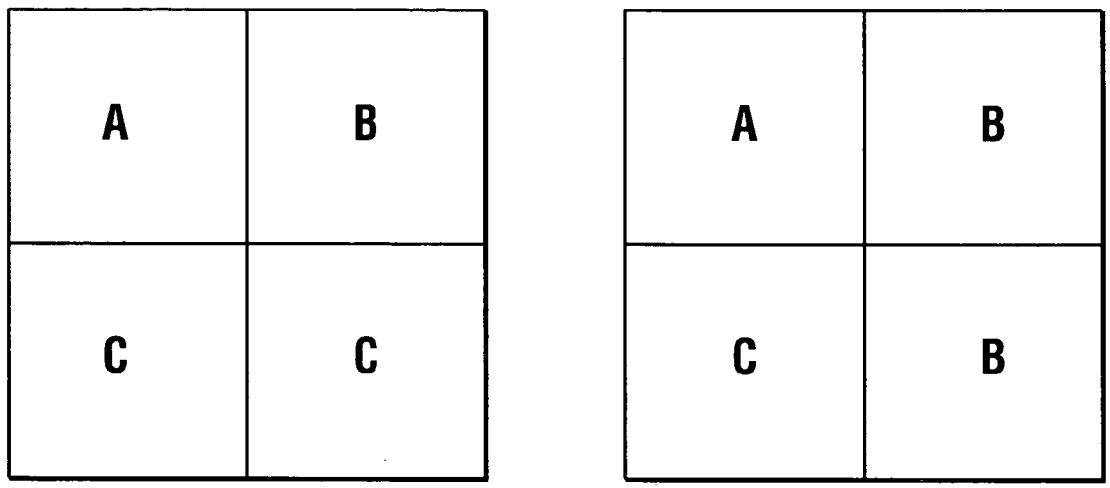
FIG. 17 shows a pair of areas, B and C, where the possible straddles are related.

In one embodiment, the search for two-dimensional straddles for each area is performed as follows. For each area, all the maximum possible straddles (assuming no other areas straddle) are determined. The maximum horizontal straddle is considered. Then the maximum horizontal extent of a straddle with vertical extent 1 is considered. The increasing vertical extents are considered until the maximum extent is considered. The search space contains the maximum vertical extent for each possible maximum horizontal extent. Next, for pairs of areas, areas where a possible straddle of one can limit the straddle of the other area are considered. FIG. 17 shows a pair of areas, B and C, where the possible straddles are related. Limited straddle extents due to pairs are added to the search space. In one embodiment, to avoid redundant searching, areas share a row or column with at least one other area. Only areas that share a row or column with at least one other area and have no possible straddles are allowed to not straddle. This search space may be represented in nested lists, a tree, or other data structure.

Figure 18:
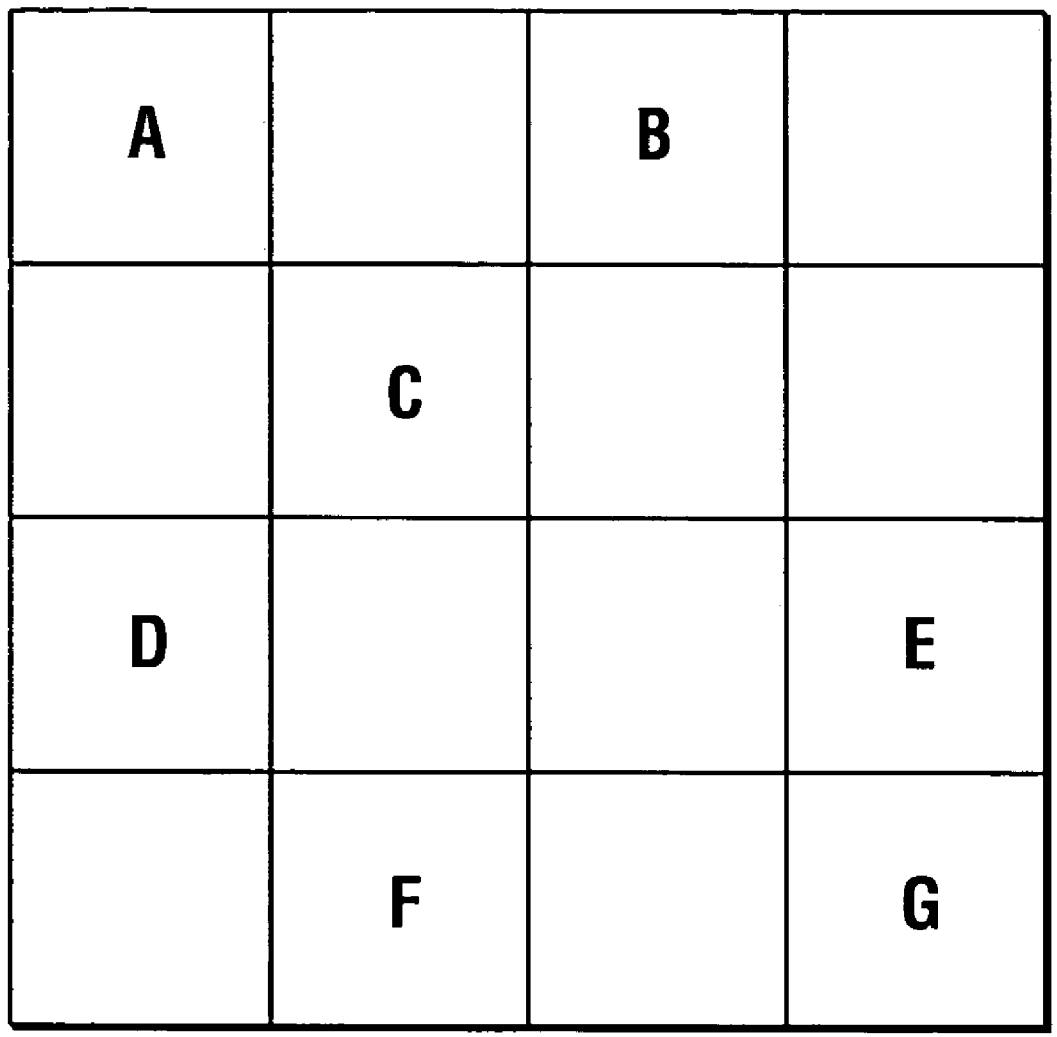
FIG. 18 shows example positions for areas for illustrating the possible straddles.

FIG. 18 shows examples of positions for areas for illustrating the possible straddles. First, ignoring pair relationships results in the following maximal straddles:
  area A: 1 right; 1 down
  area B: 1 right+1 down; 3 down
  area C: 2 right; 1 right+1 down
  area D: 2 right; 1 down
  area E: none
  area F: 1 right
  area G: none Considering pair relationships results in the following straddles:
  areas B & C: 1 right+1 down & 1 down; 3 down & 1 down; 1 right & 2 right; 1 right & 1 right+1 down
  areas B & D: 1 right+1 down & 2 right; 1 right+1 down & 1 down; 3 down & 1 right; 3 down & 1 down
  areas B & F: 1 right+1 down & 1 right; 2 down & 1 right; 3 down & none
  areas C & D: 2 right & 2 right; 2 right & 1 down; 1 right+1 down & 1 down Once the search space is determined, it can be searched. For each area, each of the possible straddles of the area can be considered. The possible straddles considered for each area will be dependent on the straddles for previous areas considered for cases with limited straddle extents due to pairs. If horizontal only or vertical only straddles have previously been checked, these can be ignored while searching this search space. Also, any straddle that causes an empty (zero height) row to the above (north of) a non-empty row or an empty (zero width) column left (west) of a non-empty column can be ignored as a redundant position. One of the consequences of the rules to avoid redundant areas is that a minimum of three areas is necessary to consider straddling.

An implementation of searching for positions should have the ability to resume a search at the point where a previous search stopped. Also, readjustment of the free space between areas with a previous position may be performed.

Furthermore, other embodiments can include additional improvements, such as a caching implementation for things like maximum width and sum of heights for column as more areas are placed, using relative positions for 1-dimensional cases, or using relative positions earlier in branch bound.

FIGS. 19A–19G show an example of reformatting an image to generate a representation of the image. There are three areas in the original image, areas 1–3. Area 1 has the highest importance. Area 2 is next in importance and area 3 has the lowest importance. The relative position information is that area 1 is above area 2, area 1 is above area 3, and area 2 is left of area 3.

Figure 19A:
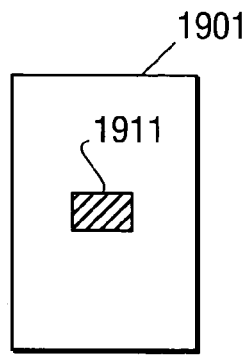
FIGS. 19A–19G show an example of reformatting an image to generate a smaller representation of the image.

Referring to FIG. 19A, the most important area, area 1 1911, is included at a minimum scale of area 1. Since this is the first area placed, its position can be in the center of the canvas 1901.

Figure 19B:
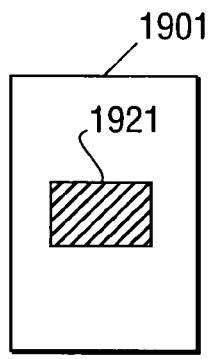

A MSUGC is computed for all included areas, which is only area 1. The MSUGC in this example is the scale that has the same cost function slope as the cost function slope of including the second most important area, area 2. Area 1 is then scaled to its MSUGC. FIG. 19B shows the scaled area 1921 on the canvas 1901.

Figure 19C:
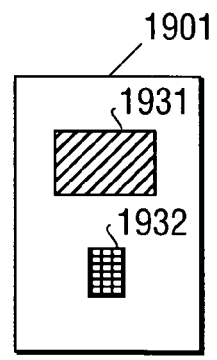

In FIG. 19C, the second most important area, area 1932, is included at its minimum scale. Based on relative position information, areas 1931 and 1932 are placed in the same column on the canvas 1901, with area 1931 above area 1932.

Figure 19D:
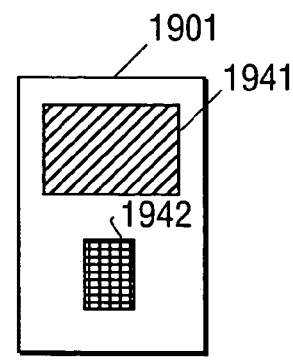

A MSUGC is computed for all included areas, namely areas 1 and 2. The MSUGC in this example is the scale for each of these areas that has the same cost function slope as the cost function slope of including the least most important area, area 3. Area 1 is scaled to its MSUGC and area 2 is scaled to its MSUGC. The scaled area 1941 and the scaled area 1942 are shown in FIG. 19D.

Figure 19E:
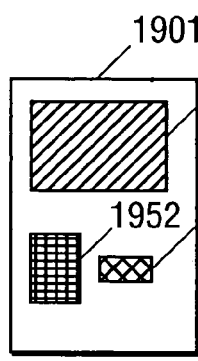

Referring to FIG. 19E, the least important area, area 1953 is included at its minimum scale. Based on relative position information, area 1952 and area 1953 are placed in a row on the canvas 1901, with area 1952 on the left. Area 1951 is in a row above areas 2 and 3, straddling the position of both areas 1952 and 1953.

Figure 19F:
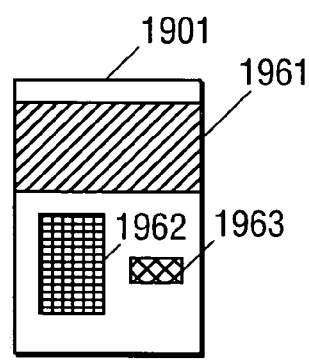

MSUGC is computed for all included areas, namely, areas 1–3. The MSUGC in this example is the scale for each of these areas that has the same cost slope as the cost slope of area 1 being scaled to the canvas width. Areas 1–3 are scaled to their corresponding MSUGC. FIG. 19F shows the scaled areas 1–3 (1961–1963). In one embodiment, FIG. 19F is the final result.

Figure 19G:
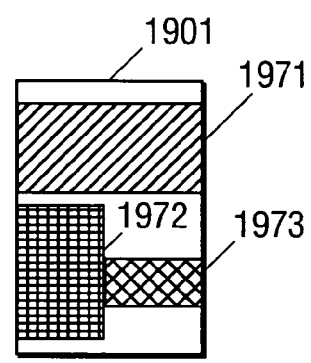

In one embodiment, areas 2 and 3 are further expanded even though the most important area, area 1, cannot expand anymore. A MSUGC for areas 2 and 3 is computed. The MSUGC in this example is the scale at which areas 2 and 3 having the same cost function slope and causing the sum of the widths of areas 2 and 3 to equal the canvas width. FIG. 19G shows the scaled areas 2 and 3 (1972 and 1973), with area 1971 remaining the same as the area 1961 in FIG. 19F.

Figure 20:
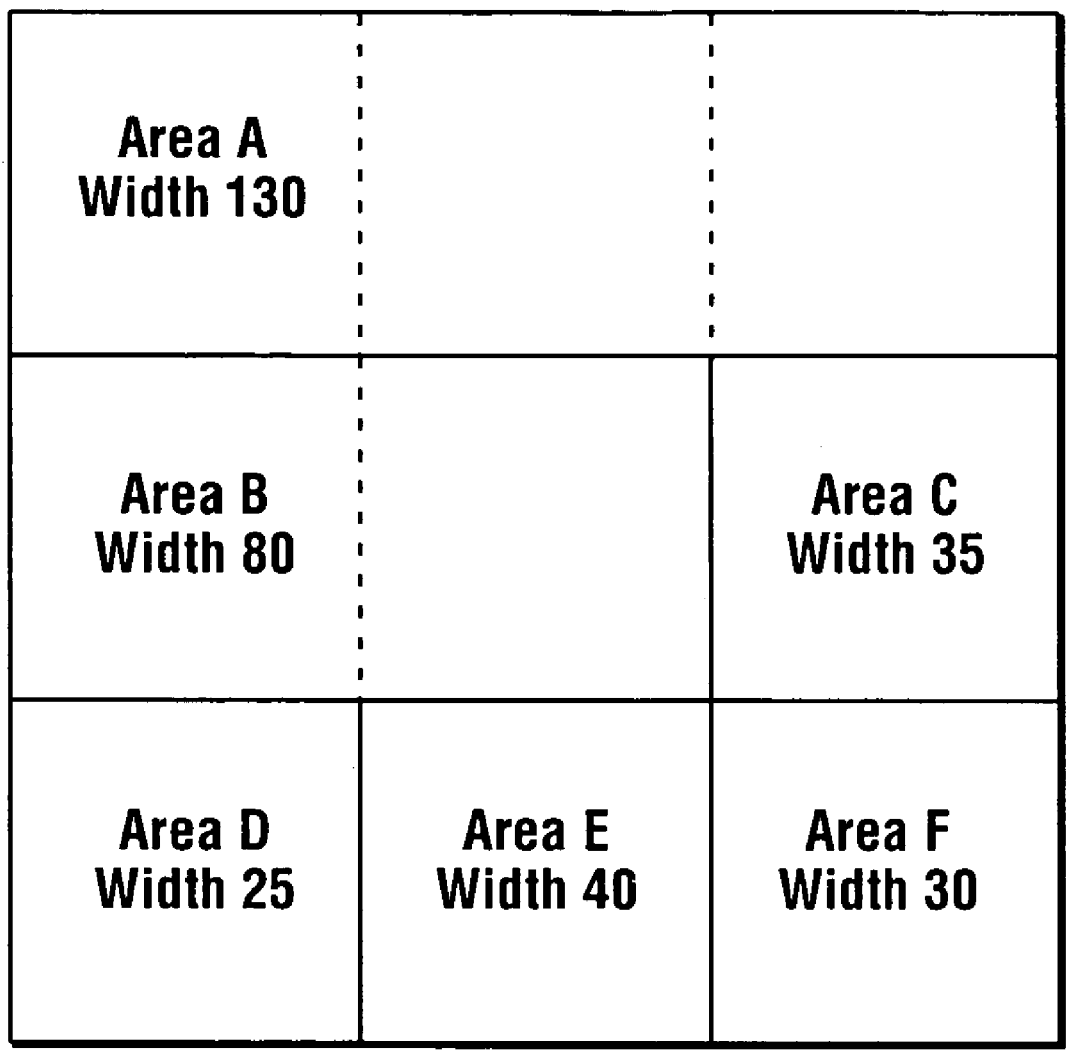
FIG. 20 shows an example of converting grid assignment to absolute positions with straddling.

FIG. 20 shows an example of converting grid assignment to absolute positions with straddling (processing block 1380). In this example, only the width of columns, horizontal straddling and horizontal position is considered. The vertical case is similar. The process starts at the third column, which contains area C and F. The maximum width of these two areas is 35. The width of the third column is therefore 35. Area A straddles the third column. Area A's width is therefore reduced by the width of the third column, 130−35=95.

The process continues at the second column that contains area E. The maximum width is E's width, which is 40 so the second column has width 40. Area A and Area B both straddle the second column. Area A's width is reduced by the width of the second column 95−40=55. Area B's width is reduced by the width of the second column 80−40=40.

The process continues at the first column. This first column contains area A with current width 55, area B with current width 40 and area D with width 25. The maximum width is 55.

The horizontal center for area A is (55+40+35)/2=65.
The horizontal center for area B is (55+40)/2=47.5.
The horizontal center for area C is 55+40+35/2=112.5.
The horizontal center for area D is 55/2=27.5.
The horizontal center for area E is 55+40/2=75.
The horizontal center for area F is 55+40+35/2=112.5.

Figure 21A:
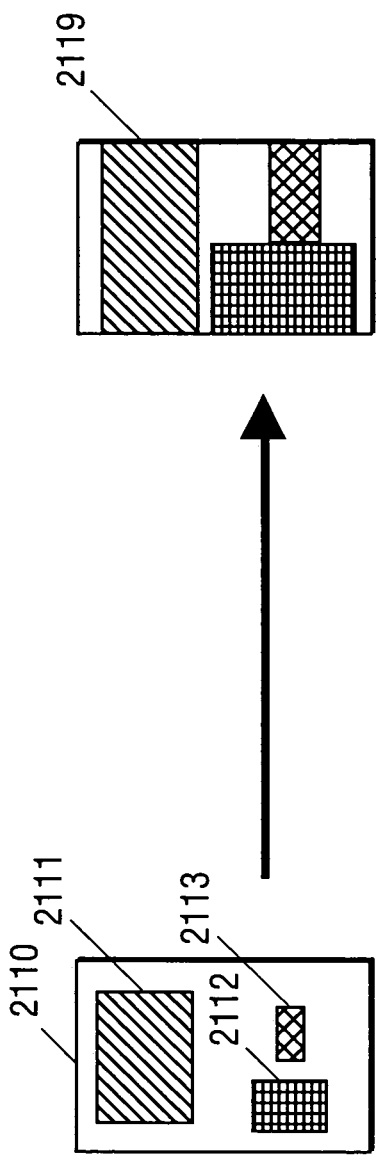
FIGS. 21A and 21B show an example of converting image segments from a document into a single representation and an example of converting image segments from two documents into a single representation.
Figure 21B:
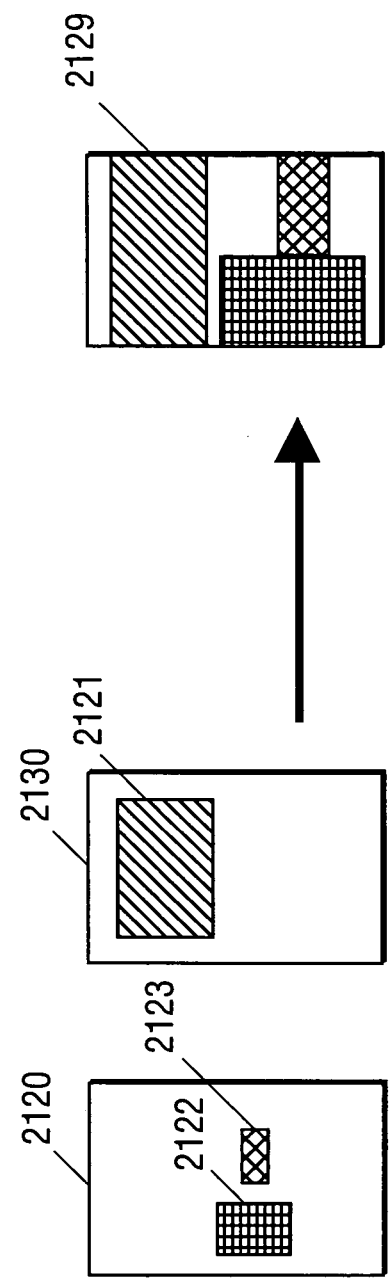

In one embodiment, segments from multiple images, documents, or pages can be handled similarly as in the case when all segments are from the same image. Referring to FIG. 21, segments 2111–2113 are taken from a single image 2110. The segments 2111–2113 are analyzed and reformatted into a representation 2119 of the image 2110. In another embodiment, segment 2121 from image 2130 and segments 2122 and 2123 from image 2120 are merged during reformatting to generate a single output image 2129. Location constraints such as ordering of images, documents, or pages from left to right or from top to bottom may be used. Alternatively, location constraints with respect to areas from different images, documents, or pages are used.

Figure 22A:
FIG. 22A shows an example of an image with 12 segments.
Figure 22B:
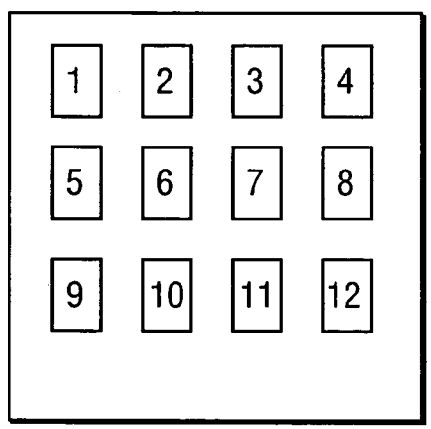
FIG. 22B shows the 12 segments from FIG. 22A arranged in English reading order.
Figure 22C:
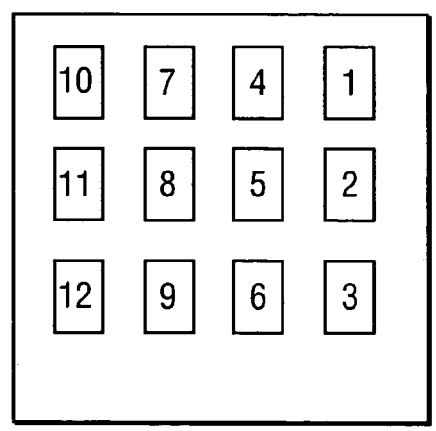
FIG. 22C shows the 12 segments from FIG. 22A arranged in Eastern reading order.
Figure 22D:
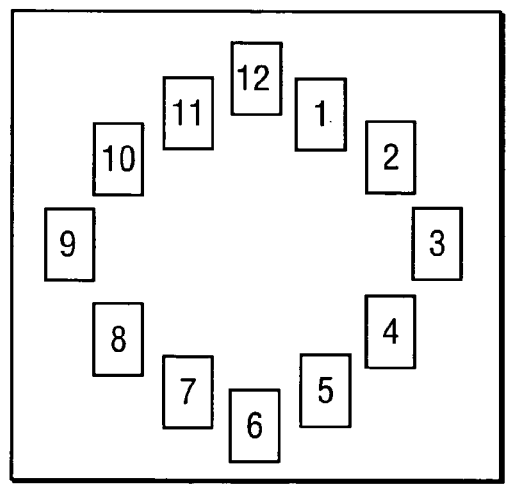
FIG. 22D shows the 12 segments from FIG. 22A arranged clockwise in a circle.

Furthermore, in one embodiment, areas of an image with a one-dimensional order can be arranged in various ways during reformatting depending on the context of the image. Examples of areas with a 1D order include words in a paragraph of text or photographs in chronological order. These areas may be fragments (i.e. they may be sub areas in a larger area.) FIG. 22A shows an input image of 12 areas, numbered 1–12. These areas are words in one embodiment, or characters in another embodiment, or a combination of words and characters in another embodiment. FIGS. 22B–22D show examples of positioning these 12 areas. In FIG. 22B, these 12 areas are positioned in Western reading order (e.g., English reading order). In FIG. 22C, the 12 areas are positioned in Eastern reading order (e.g., Japanese reading order). In FIG. 22D, the 12 areas are positioned clockwise in a circle.

Reflecting on the above discussion, the layout problem for a two-dimensional display can be separated into various elements. The various elements include objects, attributes assigned to segments, operations performed on areas, optimization, and display.

The objects are segmentation results included in the input list. In one embodiment, the objects include segment, fragment, area, intensity function (image), and segmentation hierarchy. In one embodiment, the attributes include resolution, importance, and user preferences (e.g., weightings, etc.) Different combinations of attributes are used in other embodiments. The operations include scaling, cropping, and positioning in one embodiment. Other embodiments include different combinations of operations. In one embodiment, the optimization includes distance metric, cost function, and search algorithm. Other embodiments include different types or combinations of optimization techniques. In one embodiment, the display includes original document display, target canvas display, and additional display constraints (e.g., number of pages, two columns, etc.).

An Exemplary System

Figure 23:
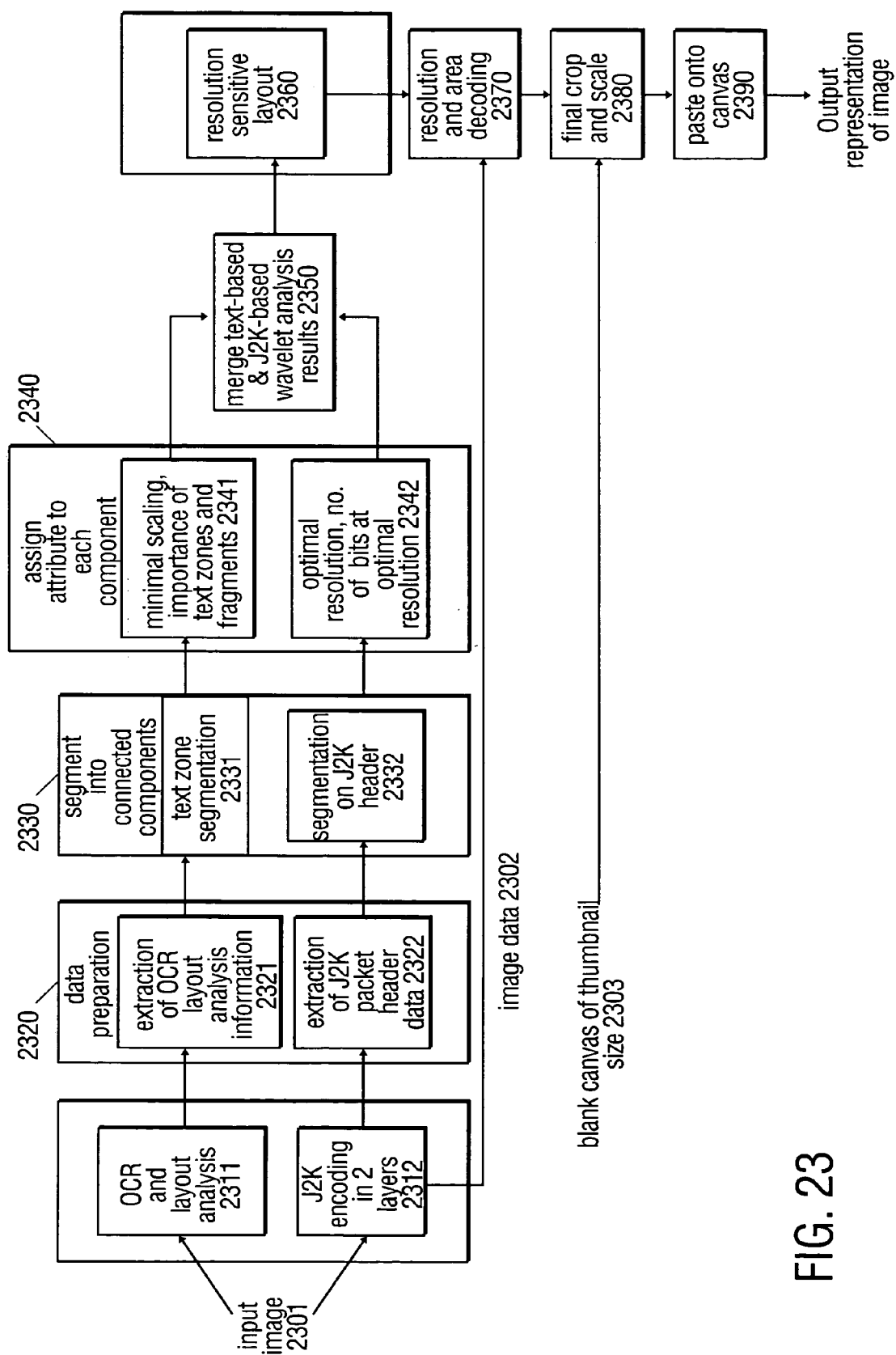
FIG. 23 shows an embodiment of an image analysis and layout system.

FIG. 23 shows an exemplary embodiment of an image analysis and layout system. The components in the system are implemented with processing logic that may comprise hardware (e.g., circuitry, dedicated logic, etc.), software (such as is run on a general purpose computer system or a dedicated machine), or a combination of both. The system performs layout analysis and optical character recognition 2311 on an image 2301. The image 2301 is also provided to J2K encoding in two layers 2312. Processing logic then performs data preparation on the outputs from the layout analysis and optical character recognition, as well as the result from the J2K encoding (processing block 2320). Data preparation includes both extraction of optical character recognition layout analysis information (processing block 2321) and extraction of J2K packet header data (processing block 2322). Examples of how this is done may be found in U.S. Patent Applications for "Reformatting Documents Using Document Analysis Information", "Content and Display Device Dependent creation of Smaller Representations of Images" and "Header-Based Processing of Images Compressed Using Multi-Scale Transforms," (U.S. patent application Ser. Nos. 10/354,811, 10/044,603 and 10/044,420), which are incorporated herein by reference, and assigned to the assignee of the present invention.

Processing logic extracts optical character recognition layout analysis information from the results of the optical character recognition layout analysis, and extracts J2K packet header data from the results of the J2K encoding. Processing logic then performs segmentation of the result from data preparation into connected components (processing block 2330). Text zone segmentation is performed on the data from the extraction of optical character recognition layout analysis information (processing block 2331), and segmentation is performed on J2K header data from extraction (processing block 2332). Then processing logic assigns attributes to each component from the segmentation processes (processing block 2340). Minimal scaling, importance of text zones and fragments are assigned to components from the text zone segmentation (processing block 2341). Optimal resolution and the number of bits at optimal resolution are assigned to components from the segmentation on J2K header data (processing block 2342). The components with attributes are then merged to generate an input list (processing block 2350). Resolution sensitive layout is performed on the input list and the result of which is provided to resolution and area decoding (processing block 2360). The J2K encoding in two layers also generates image data 2302 (processing block 2312). Processing logic performs resolution and area decoding on the image data 2302 and the output from the resolution sensitive layout 2360 (processing block 2370). Using the results from the resolution and area decoding 2370 and information on the size of canvas 2303, processing logic performs final crop and scale on segments of the image (processing block 2380). Processing logic then pastes the cropped and scaled segments onto the canvas to generate a representation of the image that is dependent on the image content and the display device (processing block 2390).

Figure 24:
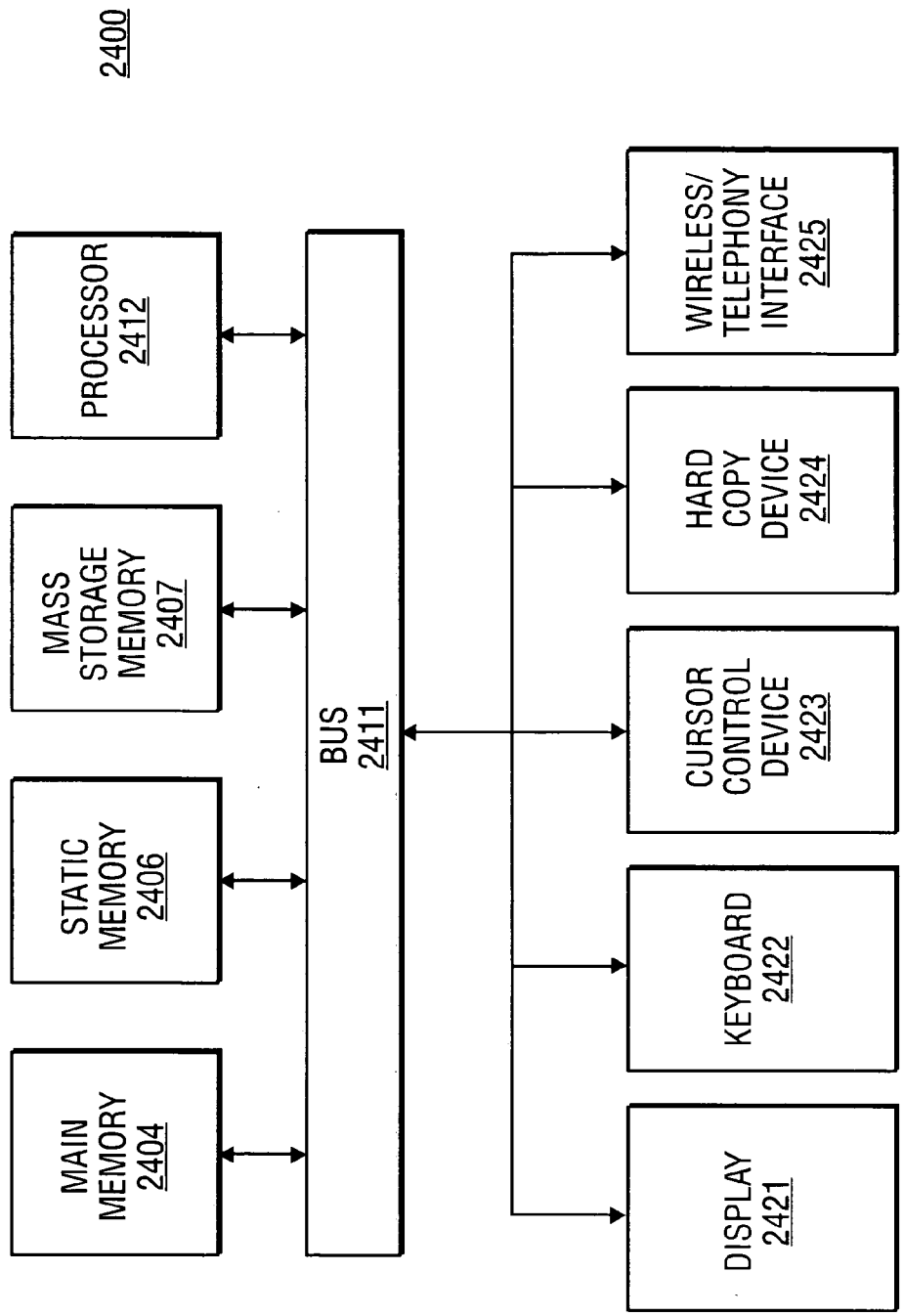
FIG. 24 shows an exemplary embodiment of a computer system.

FIG. 24 is a block diagram of an exemplary computer system that may perform one or more of the operations described herein. Referring to FIG. 24, computer system 2400 may comprise an exemplary client 2450 or server 2400 computer system. Computer system 2400 comprises a communication mechanism or bus 2411 for communicating information, and a processor 2412 coupled with bus 2411 for processing information. Processor 2412 includes a microprocessor, but is not limited to a microprocessor, such as, for example, Pentium™, PowerPC™, Alpha™, etc.

System 2400 further comprises a random access memory (RAM), or other dynamic storage device 2404 (referred to as main memory) coupled to bus 2411 for storing information and instructions to be executed by processor 2412. Main memory 2404 also may be used for storing temporary variables or other intermediate information during execution of instructions by processor 2412.

Computer system 2400 also comprises a read only memory (ROM) and/or other static storage device 2406 coupled to bus 2411 for storing static information and instructions for processor 2412, and a data storage device 2407, such as a magnetic disk or optical disk and its corresponding disk drive. Data storage device 2407 is coupled to bus 2411 for storing information and instructions.

Computer system 2400 may further be coupled to a display device 2421, such as a cathode ray tube (CRT) or liquid crystal display (LCD), coupled to bus 2411 for displaying information to a computer user. An alphanumeric input device 2422, including alphanumeric and other keys, may also be coupled to bus 2411 for communicating information and command selections to processor 2412. An additional user input device is cursor control 2423, such as a mouse, trackball, trackpad, stylus, or cursor direction keys, coupled to bus 2411 for communicating direction information and command selections to processor 2412, and for controlling cursor movement on display 2421.

Another device that may be coupled to bus 2411 is hard copy device 2424, which may be used for printing instructions, data, or other information on a medium such as paper, film, or similar types of media. Furthermore, a sound recording and playback device, such as a speaker and/or microphone may optionally be coupled to bus 2411 for audio interfacing with computer system 2400. Another device that may be coupled to bus 2411 is a wired/wireless communication capability 2425 to communication to a phone or handheld palm device.

Note that any or all of the components of system 2400 and associated hardware may be used in the present invention. However, it can be appreciated that other configurations of the computer system may include some or all of the devices.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
   selecting a plurality of image segments having a plurality of attributes; and
   determining a plurality of relative positions of each image segment location for the plurality of image segments, and a plurality of geometric operations to be performed on the plurality of image segments according to the plurality of attributes and display constraints.

2. The method of claim 1, further comprising outputting a plurality of instructions executable to cause performance of the plurality of operations on the plurality of image segments.

3. The method of claim 1, further comprising:
   performing the plurality of operations on the plurality of image segments; and
   displaying the image segments.

4. The method of claim 1, wherein the plurality of geometric operations includes scaling and cropping.

5. The method of claim 1, wherein the plurality of geometric operations includes scaling.

6. The method of claim 5 further comprising expanding each of the image segments to fill free space.

7. The method of claim 1, wherein the plurality of geometric operations includes cropping.

8. The method of claim 7 wherein cropping comprises cropping fragments.

9. The method of claim 7 wherein cropping comprises cropping segments.

10. The method of claim 7 wherein cropping comprises cropping sets.

11. The method of claim 1, further comprising converting the plurality of relative positions into a plurality of absolute positions on a target canvas and displaying the plurality of image segments at the plurality of absolute positions on the target canvas.

12. The method of claim 1, wherein the plurality of attributes includes a preferred resolution and an importance value for each of the plurality of image segments.

13. The method of claim 12, wherein the plurality of operations includes scaling each of the plurality of image segments at the preferred resolution and packing as many scaled image segments as possible into a target display.

14. The method of claim 12, wherein the plurality of operations includes cropping one or more of the plurality of image segments and packing as many image segments as possible into a target display.

15. The method of claim 12, wherein the plurality of operations includes cropping one or more of the plurality of image segments and packing image segments into a target display to maximize importance.

16. The method of claim 12, wherein the plurality of operations includes
   cropping one or more of the plurality of image segments and packing as many image segments as possible into a target display.

17. The method of claim 12, wherein the plurality of operations includes
   cropping one or more of the plurality of image segments and packing scaled image segments into a target display to maximize importance.

18. The method of claim 12, wherein the target display is on a personal digital assistant.

19. The method of claim 12, wherein the plurality of attributes further includes an image segment type, an alignment, an anchor point of segment, and a reading order.

20. The method of claim 12, further comprising initializing the plurality of image segments.

21. The method of claim 20, wherein initializing the plurality of image segments includes sorting the plurality of image segments by the importance value.

22. The method of claim 1, wherein determining the plurality of operations comprises evaluating a plurality of cost functions.

23. The method of claim 22, wherein the plurality of cost functions relate importance values of the plurality of image segments and the plurality of operations to cost.

24. The method of claim 1, wherein the plurality of image segments is selected from a document.

25. The method of claim 1, wherein the plurality of image segments is selected from a plurality of documents.

26. The method defined in claim 1 further comprising:
   placing a number of image segments on a grid;
   checking to determine if positions on the grid are feasible; and
   repositioning the number of image segments on the grid, if the positions are not feasible, until a set of feasible positions are located.

27. The method defined is claim 26 further comprising searching for positions on the grid.

28. The method defined in claim 27 further comprising eliminating equivalent positions for the image segments.

29. The method defined in claim 26 further comprising: computing the amount of free space.

30. The method defined in claim 26 wherein computing the amount of free space is performed taking into account straddling.

31. A method comprising:
selecting a plurality of image segments having a plurality of attributes, wherein the plurality of attributes is assigned to the plurality of image segments during text-based analysis and JPEG 2000-based wavelet analysis of the plurality of image segments; and
determining a plurality of positions and a plurality of geometric operations to be performed on the plurality of image segments according to the plurality of attributes and display constraints.

32. A method comprising:
selecting a plurality of image segments having a plurality of attributes; and
determining a plurality of positions and a plurality of geometric operations to be performed on the plurality of image segments according to the plurality of attributes and display constraints, wherein determining the plurality of positions and the plurality of geometric operations comprises:
determining a relative position for each of the plurality of image segments according to the plurality of attributes, wherein each of the plurality of image segments is associated with a cost function slope; and
expanding each of the plurality of image segments at the relative position such that the expanded image segments have substantially the same cost function slope.

33. The method of claim 32, wherein selecting the plurality of image segments is based on the cost function slope.

34. A method, comprising:
selecting a plurality of image segments having a plurality of attributes; and
determining a plurality of positions and a plurality of geometric operations to be performed on the plurality of image segments according to the plurality of attributes and display constraints, wherein determining the plurality of positions and the plurality of geometric operations comprises:
creating a plurality of boxes, with one box of the plurality of boxes for each of the plurality of image segments; and
for each box of the plurality of boxes associated with an image segment, determining a plurality of relative positions for the image segment with respect to said each box, and for each of the plurality of relative positions,
determining a scaling operation and a cropping operation, and
evaluating a cost function relating the scaling operation and the cropping operation at the relative position.

35. The method of claim 34, wherein the plurality of relative positions includes top, bottom, left, and right.

36. The method of claim 34, further comprising converting the plurality of boxes to a plurality of absolute locations on a canvas.

37. The method of claim 36, wherein the plurality of attributes includes a maximal scale.

38. The method of claim 36, further comprising expanding each of the plurality of image segments to fill free space in each of the plurality of boxes.

39. A method comprising:
performing a first analysis and a second analysis on an image to generate a plurality of image segments with a first plurality of attributes and a second plurality of attributes;
performing a resolution sensitive layout on the plurality of image segments to reformat the image;
performing a plurality of operations on the plurality of image segments in response to results from the resolution sensitive layout;
determining a relative position of an image segment chosen from the plurality of image segments and a plurality of geometric operations on the image segment according to the first plurality of attributes and the second plurality of attributes; and
displaying the operated image segments on a target canvas.

40. The method of claim 39, wherein the resolution sensitive layout comprises:
initializing the plurality of image segments.

41. The method of claim 40, wherein the resolution sensitive layout further comprises:
converting the relative position to an absolute position on the target canvas, wherein the operated image segments are displayed at the absolute position on the target canvas; and
outputting a plurality of instructions executable to cause performance of the plurality of geometric operations.

42. A method comprising:
performing a first analysis and a second analysis on an image to generate a plurality of image segments with a first plurality of attributes and a second plurality of attributes, wherein the first analysis is a text-based analysis comprising:
performing optical character recognition analysis on the image;
extracting optical character recognition analysis information;
segmenting the image into the plurality of text zones; and
assigning the first plurality of attributes to the plurality of text zones;
performing a resolution sensitive layout on the plurality of image segments to reformat the image;
performing a plurality of operations on the plurality of image segments in response to results from the resolution sensitive layout; and displaying the operated image segments on a target canvas.

43. A method comprising:
performing a first analysis and a second analysis on an image to generate a plurality of image segments with a first plurality of attributes and a second plurality of attributes, wherein the second analysis is an analysis comprising:
performing JPEG 2000 encoding on the image;
extracting JPEG 2000 packet header data from the image;
segmenting the JPEG 2000 packet header data into a plurality of components; and
assigning the second plurality of attributes to the plurality of components;
performing a resolution sensitive layout on the plurality of image segments to reformat the image;
performing a plurality of operations on the plurality of image segments in response to results from the resolution sensitive layout; and displaying the operated image segments on a target canvas.

44. An article of manufacture comprising a computer-readable medium embodying instructions, the instructions, when executed by a computer, causing the computer to perform a method, the method comprising:
  selecting a plurality of image segments having a plurality of attributes; and
  determining a plurality of relative positions of image segment locations for image segments of the plurality of image segments, and a plurality of geometric operations to be performed on the plurality of image segments according to the plurality of attributes and display constraints.

45. The article of manufacture of claim 44, wherein the method further comprises outputting a plurality of instructions executable to cause
  performance of the plurality of operations on the plurality of image segments.

46. The article of manufacture of claim 44, wherein the method further comprises:
  performing the plurality of operations on the plurality of image segments; and
  displaying the operated image segments.

47. The article of manufacture of claim 44, wherein the plurality of geometric operations includes scaling and cropping.

48. The article of manufacture of claim 47, wherein the method further comprises converting the plurality of relative positions into a plurality of absolute positions on a target canvas and displaying the plurality of image segments at the plurality of absolute positions on the target canvas.

49. The article of manufacture of claim 44, wherein the plurality of attributes includes a preferred resolution and an importance value for each of the plurality of image segments.

50. The article of manufacture of claim 49, wherein the plurality of operations includes scaling each of the plurality of image segments at the preferred resolution and packing as many scaled image segments as possible into a target display.

51. The article of manufacture of claim 50, wherein the target display is on a personal digital assistant.

52. The article of manufacture of claim 49, wherein the plurality of attributes further includes image segment type, alignment, anchor point of segment, and reading order.

53. The article of manufacture of claim 49, wherein the method further comprises initializing the plurality of image segments.

54. The article of manufacture of claim 53, wherein initializing the plurality of image segments includes sorting the plurality of image segments by the importance value.

55. The article of manufacture of claim 44, wherein determining the plurality of operations comprises evaluating a plurality of cost functions.

56. The article of manufacture of claim 55, wherein the plurality of cost functions relate importance values of the plurality of image segments and the plurality of operations to cost.

57. The article of manufacture of claim 44, wherein the plurality of image segments is selected from a document.

58. The article of manufacture of claim 44, wherein the plurality of image segments is selected from a plurality of documents.

59. An article of manufacture comprising a computer-readable medium embodying instructions, the instructions, when executed by a computer, causing the computer to perform a method, the method comprising:
  selecting a plurality of image segments having a plurality of attributes, wherein the plurality of attributes are assigned to the plurality of image segments during text-based analysis and JPEG 2000-based wavelet analysis of the plurality of image segments; and
  determining a plurality of positions and a plurality of geometric operations on the plurality of image segments according to the plurality of attributes.

60. An article of manufacture comprising a computer-readable medium embodying instructions, the instructions, when executed by a computer, causing the computer to perform a method, the method comprising:
  selecting a plurality of image segments having a plurality of attributes; and
  determining a plurality of positions and a plurality of geometric operations on the plurality of image segments according to the plurality of attributes, wherein determining the plurality of positions and the plurality of geometric operations comprises:
    determining a relative position for each of the plurality of image segments according to the plurality of attributes, wherein each of the plurality of image segments is associated with a cost function slope; and
    expanding each of the plurality of image segments at the relative position such that the expanded image segments have substantially the same cost function slope.

61. The article of manufacture of claim 60, wherein selecting the plurality of image segments is based on the cost function slope.

62. An article of manufacture comprising a computer-readable medium embodying instructions, the instructions, when executed by a computer, causing the computer to perform a method, the method comprising:
  selecting a plurality of image segments having a plurality of attributes; and
  determining a plurality of positions, and a plurality of geometric operations on the plurality of image segments according to the plurality of attributes, wherein determining the plurality of positions and the plurality of geometric operations comprises:
    creating a plurality of boxes, one box for each of the plurality of image segments; and
    for each of the plurality of boxes associated with an image segment, determining a plurality of relative positions for the image segment with respect to the box, and for each of the plurality of relative positions,
    determining a scaling operation and a cropping operation, and
    evaluating a cost function relating the scaling operation and the cropping operation at the relative position.

63. The article of manufacture of claim 62, wherein the plurality of relative positions includes top, bottom, left, and right.

64. The article of manufacture of claim 62, wherein the method further comprises converting the plurality of boxes to a plurality of absolute locations on a canvas.

65. The article of manufacture of claim 64, wherein the method further comprises expanding each of the plurality of image segments to fill free space in each of the plurality of boxes.

66. The article of manufacture of claim 64, wherein the plurality of attributes includes a maximal scale.

67. The article of manufacture of claim 66, wherein the method further comprises uniformly scaling the plurality of image segments to the maximal scale.

68. An article of manufacture comprising a computer-readable medium embodying instructions, the instructions, when executed by a computer, causing the computer to perform a method, the method comprising:
- performing a first analysis and a second analysis on an image to generate a plurality of image segments with a first plurality of attributes and a second plurality of attributes;
- performing a plurality of operations on the plurality of image segments in response to results from the resolution sensitive layout;
- determining a relative position of an image segment chosen from the plurality of image segments and a plurality of geometric operations on the image segment according to the first plurality of attributes and the second plurality of attributes; and
- displaying the operated image segments on a target canvas.

69. The article of manufacture of claim 68, wherein the resolution sensitive layout comprises:
- initializing the plurality of image segments; and
- determining a relative position of an image segment chosen from the plurality of image segments and a plurality of geometric operations on the image segment according to the first plurality of attributes and the second plurality of attributes.

70. The article of manufacture of claim 69, wherein the resolution sensitive layout further comprises:
- converting the relative position to an absolute position on the target canvas, wherein the operated image segments are displayed at the absolute position on the target canvas; and
- outputting a plurality of instructions executable to cause performance of the plurality of geometric operations.

71. An article of manufacture comprising a computer-readable medium embodying instructions, the instructions, when executed by a computer, causing the computer to perform a method, the method comprising:
- performing a first analysis and a second analysis on an image to generate a plurality of image segments with a first plurality of attributes and a second plurality of attributes, wherein the first analysis is an analysis comprising:
  - performing optical character recognition analysis on the image;
  - extracting optical character recognition analysis information;
  - segmenting the image into the plurality of text zones; and
  - assigning the first plurality of attributes to the plurality of text zones;
- performing a resolution sensitive layout on the plurality of image segments to reformat the image;
- performing a plurality of operations on the plurality of image segments in response to result from the resolution sensitive layout; and
- displaying the operated image segments on a target canvas.

72. An article of manufacture comprising a computer-readable medium embodying instructions, the instructions, when executed by a computer, causing the computer to perform a method, the method comprising:
- performing a first analysis and a second analysis on an image to generate a plurality of image segments with a first plurality of attributes and a second plurality of attributes, wherein the second analysis is a JPEG 2000-based wavelet analysis comprising:
  - performing JPEG 2000 encoding on the image;
  - extracting JPEG 2000 packet header data from the image;
  - segmenting the JPEG 2000 packet header data into a plurality of components; and
  - assigning the second plurality of attributes to the plurality of components;
- performing a resolution sensitive layout on the plurality of image segments to reformat the image;
- performing a plurality of operations on the plurality of image segments in response to result from the resolution sensitive layout; and
- displaying the operated image segments on a target canvas.

73. A system comprising:
- an interface to receive an image;
- a display device; and
- a computer to perform analysis on the image to determine a plurality of attributes of the image, to select a plurality of image segments from the image, and to determine a plurality of relative positions of each image segment location for the plurality of image segments, and a plurality of geometric operations on the plurality of image segments according to the plurality of attributes.

74. The system of claim 73, wherein the plurality of geometric operations includes scaling and cropping.

75. The system of claim 73, wherein the plurality of positions includes a plurality of relative positions, and the computer converts the plurality of relative positions to a plurality of absolute positions on the display device.

76. The system of claim 75, wherein the display device displays the operated image segments at the plurality of absolute positions.

77. A system comprising:
- an interface to receive an image;
- a display device; and
- a processor to perform analysis on the image to determine a plurality of attributes of the image, to select a plurality of image segments from the image, and to determine a plurality of positions of the plurality of image segments and a plurality of geometric operations on the plurality of image segments according to the plurality of attributes, wherein the analysis includes text-based analysis and JPEG 2000-based wavelet analysis.

* * * * *